US012735587B2

(12) United States Patent
Kaneko et al.

(10) Patent No.: US 12,735,587 B2
(45) **Date of Patent: *Sep. 15, 2026**

(54) AQUEOUS INK, INK CARTRIDGE AND INK JET RECORDING METHOD

(71) Applicant: CANON KABUSHIKI KAISHA, Tokyo (JP)

(72) Inventors: Yoshiyuki Kaneko, Kanagawa (JP); Mikio Sanada, Kanagawa (JP); Yoshihisa Yamashita, Osaka (JP); Junichi Sakai, Tokyo (JP); Hideki Yamakami, Kanagawa (JP); Shoichi Takeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

This patent is subject to a terminal disclaimer.

(21) Appl. No.: 17/937,624

(22) Filed: Oct. 3, 2022

(65) Prior Publication Data

US 2023/0108989 A1 Apr. 6, 2023

(30) Foreign Application Priority Data

Oct. 6, 2021 (JP) ................................ 2021-165007
Sep. 13, 2022 (JP) ................................ 2022-145603

(51) Int. Cl.
*C09D 11/322* (2014.01)
*C09D 11/033* (2014.01)
*C09D 11/037* (2014.01)
*C09D 11/107* (2014.01)
*C09D 11/38* (2014.01)

(52) U.S. Cl.
CPC .......... *C09D 11/322* (2013.01); *C09D 11/033* (2013.01); *C09D 11/037* (2013.01); *C09D 11/107* (2013.01); *C09D 11/38* (2013.01)

(58) Field of Classification Search
CPC ... C09D 11/322; C09D 11/033; C09D 11/037; C09D 11/107; C09D 11/38
See application file for complete search history.

(56) References Cited

U.S. PATENT DOCUMENTS

2004/0024091 A1 2/2004 Yamada
2011/0281032 A1 11/2011 Kagata
2013/0273259 A1 10/2013 Depardieu
2018/0311968 A1 11/2018 Sato
2019/0225826 A1 7/2019 Ingle
(Continued)

FOREIGN PATENT DOCUMENTS

CN 1681894 A 10/2005
CN 1721483 A 1/2006
(Continued)

OTHER PUBLICATIONS

English machine translation of JP 2011-225867A. (Year: 2011).*
English machine translation of JP 2020-084072A. (Year: 2020).*

*Primary Examiner* — John E Uselding
(74) *Attorney, Agent, or Firm* — Canon U.S.A., Inc. IP Division

(57) ABSTRACT

An aqueous ink contains a titanium oxide particle, poly (acrylic acid) and potassium ions, in which the titanium oxide particle contains titanium oxide, at least part of the surface of the titanium oxide is covered with alumina and silica, and the poly(acrylic acid) content is 0.05 times or more to 0.40 times or less the alumina content in terms of a mass ratio.

23 Claims, 2 Drawing Sheets

(56) References Cited

U.S. PATENT DOCUMENTS

| | | | |
|---|---|---|---|
| 2019/0231662 | A1 | 8/2019 | Lingoes |
| 2019/0352434 | A1 | 11/2019 | Yoshida et al. |

FOREIGN PATENT DOCUMENTS

| | | | |
|---|---|---|---|
| CN | 105143365 | A | 12/2015 |
| CN | 107254198 | A | 10/2017 |
| CN | 108136770 | A | 6/2018 |
| CN | 108625188 | A | 10/2018 |
| CN | 110023415 | A | 7/2019 |
| EP | 3 360 682 | A1 | 8/2018 |
| JP | 2009114346 | A | 5/2009 |
| JP | 2009191222 | A | 8/2009 |
| JP | 2011225867 | A | 11/2011 |
| JP | 2012122028 | A | 6/2012 |
| JP | 2016079241 | A | 5/2016 |
| JP | 2017521348 | A | 8/2017 |
| JP | 2020084072 | A | 6/2020 |
| JP | 2021512077 | A | 5/2021 |
| WO | 2018/144181 | A1 | 8/2018 |
| WO | 2021/123127 | A1 | 6/2021 |

* cited by examiner

AQUEOUS INK, INK CARTRIDGE AND INK JET RECORDING METHOD

BACKGROUND OF THE INVENTION

Field of the Invention

The present disclosure relates to an aqueous ink, an ink cartridge and an ink jet recording method.

Description of the Related Art

In recent years, ink jet recording apparatuses have been widely used for outputting advertisements and exhibits with recording media, such as paper and resin films. For example, in order to express a clear color image even on a transparent recording medium, a white ink is used in combination with a black ink and basic color inks (hereinafter, these may be collectively referred to as a "color ink"). Specifically, a recording method is employed in which a white ink is applied in advance to a portion of a transparent recording medium including a region where an image is to be recorded to perform undercoating treatment, and color inks is applied thereon, or each ink is applied in the reverse order (what is called back printing).

Titanium oxide is widely used as a coloring material for a white ink because it is low in cost and excellent in characteristics, such as whiteness and concealability, required as a white ink. To stably disperse titanium oxide in an aqueous ink, a dispersant is required. However, titanium oxide, which is a metal oxide, has a higher specific gravity than the coloring materials used for the inks of other colors. For this reason, there has been a disadvantage that sedimentation cannot be sufficiently suppressed even when a dispersant is used. In such a situation, importance is placed on a sedimentation recovery property in which titanium oxide is dispersed again even if the titanium oxide has once sedimented, and a sticking recovery property in which a sticking matter formed by drying a pigment is dissolved.

Up to now, methods have been studied to obtain the sedimentation recovery property of pigment and the sticking recovery property of ink by the components of the ink. For example, PCT Japanese Translation Patent Publication No. 2017-521348 discloses a method for producing a dry titanium dioxide product in which a part of a silane coupling agent is covalently bonded to the surface of a titanium oxide particle by surface-treating the titanium oxide particle with silica, then further surface-treating the titanium oxide particle with the silane coupling agent and drying the resulting titanium oxide particle. PCT Japanese Translation Patent Publication No. 2021-512077 discloses an ink composition containing titanium oxide that has been subjected to surface treatment with silica and alumina, a (meth)acrylic acid homopolymer or a salt thereof and a rheology modifier. Japanese Patent Laid-Open No. 2019-44069 discloses an ink composition that contains a pigment containing a powder with a first charge, an ionic polymer with a second charge different from the first charge, and a multivalent ion with a first charge.

SUMMARY OF THE INVENTION

The inventors have conducted studies on the sedimentation recovery property of a pigment and the sticking recovery property of an ink with an aqueous ink prepared using the dry titanium dioxide disclosed in PCT Japanese Translation Patent Publication No. 2017-521348 and with an aqueous ink prepared using the ink composition disclosed in PCT Japanese Translation Patent Publication No. 2021-512077 and Japanese Patent Laid-Open No. 2019-44069. As a result, it has been found that the sedimentation recovery property of the pigment and the sticking recovery property of the ink are insufficient for the current situation in which good performance is required even in assumed more severe environmental changes, and that there is room for performance improvement in order to allow users to smoothly use the ink.

Accordingly, the present disclosure provides a titanium oxide-containing aqueous ink that is used for ink jet recording and that has superior sedimentation recovery property of a pigment and sticking recovery property of the ink, an ink cartridge containing the aqueous ink and an ink jet recording method.

One aspect of the present disclosure is directed to providing an aqueous ink for ink jet recording, the aqueous ink containing a titanium oxide particle, a poly(acrylic acid) and a potassium ion, in which the titanium oxide particle contains titanium oxide, at least part of the surface of the titanium oxide is covered with alumina and silica, and the amount of the poly(acrylic acid) contained in the aqueous ink is 0.05 times or more to 0.40 times or less the amount of the alumina contained in the titanium oxide particle in terms of a mass ratio.

Further features of the present disclosure will become apparent from the following description of exemplary embodiments with reference to the attached drawings.

DESCRIPTION OF THE EMBODIMENTS

Figure 1:
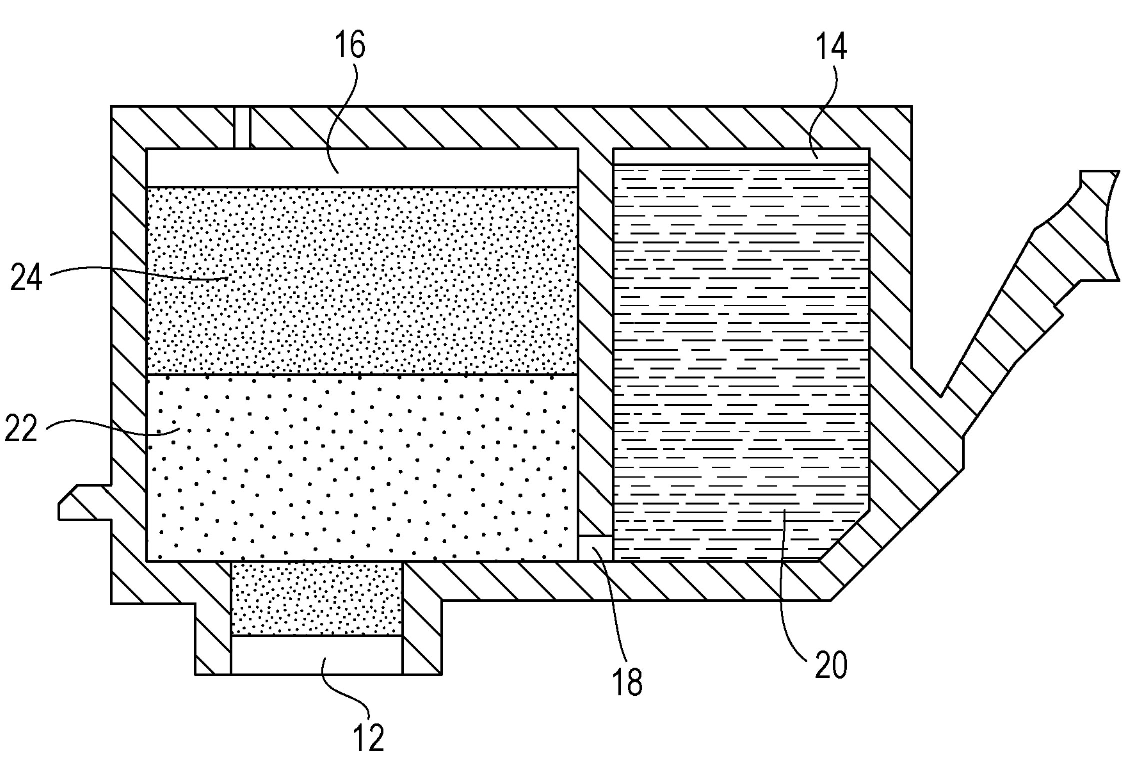
FIG. 1 is a cross-sectional view schematically illustrating an exemplary embodiment of an ink cartridge of the present disclosure.

The present disclosure will be described in more detail below with reference to preferred exemplary embodiments. In an embodiment of the present disclosure, when the compound is a salt, the salt is present in an ink in a state of being dissociated into ions, but it is expressed as "the ink contains the salt" for convenience. Titanium oxide and a titanium oxide particle may be simply referred to as a "pigment". An aqueous ink for ink jet recording may be simply referred to as an "ink". Physical property values are ones at room temperature (25° C.) unless otherwise specified.

An inorganic oxide, such as titanium oxide, reacts with water molecules contained in an aqueous medium in an aqueous ink to form a hydroxy group (hereinafter, referred to as a "surface hydroxy group", in some cases) on the surface of the inorganic oxide. For this reason, in an aqueous ink for ink jet recording, an inorganic oxide is typically used in a state in which the inorganic oxide has been subjected to surface treatment with a different inorganic oxide, such as alumina or silica, in order to further improve the storage stability of the ink while utilizing the formed surface hydroxy group. The surface hydroxy group of a titanium oxide particle has properties unique to the inorganic oxide corresponding to an inorganic compound used for the surface treatment, and the isoelectric point, which is an index of the strength as an acid, differs in accordance with the type of inorganic compound. Accordingly, although titanium oxide itself is an inorganic oxide, the surface of the titanium oxide particle exhibits the properties of the inorganic oxide corresponding to an inorganic compound used for the surface treatment, and the surface charge of the titanium oxide particle strongly depends on the pH of the aqueous medium, the type of surface treatment agent and the amount of surface treatment agent used.

The inventors have conducted studies on how to improve the sedimentation recovery property of a pigment and the sticking recovery property of an ink by using a component contained in the ink. The inventors have first investigated factors for deterioration in the sedimentation recovery property of the pigment and the sticking recovery property of the ink. The distance between the titanium oxide particles was maintained by the dispersant in the ink; however, when the distance between the titanium oxide particles became closer, the titanium oxide particles aggregated to deteriorate these properties. It has been found that the aggregation was easily promoted by the surface charge of the titanium oxide particles. Under an alkaline condition, which is a typical liquid property of an aqueous ink for ink jet recording, alumina and silica on the surfaces of the titanium oxide particles form surface hydroxy groups. Moreover, alumina-derived surface hydroxy groups are positively charged, whereas silica-derived surface hydroxy groups are negatively charged. Thus, when the distance between titanium dioxide particles is reduced, electrostatic action is considered to act to promote aggregation of the titanium oxide particles.

The inventors have conducted studies on the addition of a material to an ink in order to provide the sedimentation recovery property of a pigment and the sticking recovery property of an ink while suppressing the influence of the surface charge of a titanium oxide particle. As a result, the inventors have found that the sedimentation recovery property of a pigment and the sticking recovery property of an ink can be improved by the use of an aqueous ink containing a titanium oxide particle that has been subjected to specific surface treatment, a poly(acrylic acid) in a specific mass ratio based on the titanium oxide particle and a potassium ion.

That is, the ink according to an embodiment of the present disclosure has the following features: A titanium oxide particle containing titanium oxide whose surface is at least partially covered with alumina and silica is used. The ink further contains a poly(acrylic acid) and a potassium ion. The poly(acrylic acid) content is 0.05 times or more to 0.40 times or less the amount of alumina covering the titanium oxide particle in terms of a mass ratio. The inventors speculate that the mechanism by which the above-described configuration improves the sedimentation recovery property of the pigment and the sticking recovery property of the ink is as described below.

The ink contains the poly(acrylic acid) and the potassium ion. The poly(acrylic acid) has a molecular structure in which multiple carboxylic acid groups are bonded to a hydrocarbon chain. The potassium ion has a large ionic radius and ionization tendency among alkali metal ions. The presence of the potassium ion in the ink promotes the ionization of the carboxylic acid groups of the poly(acrylic acid) and the surface hydroxy group of the titanium oxide particle. The ionized carboxylic acid group is negatively charged and is adsorbed to the positively charged surface hydroxy group derived from alumina by electrostatic action. It is thus possible to cancel the positive charge of the titanium oxide particle to suppress the aggregation of the titanium oxide particle. Accordingly, when the dried ink is re-dissolved, the carboxylic acid group or the hydroxy group can be easily ionized and dissolved to provide a superior sticking recovery property of the ink. When a potassium ion is not present in the ink, the ionization of a carboxylic acid group or the like is not promoted, and an electrostatic interaction with the alumina-derived surface hydroxy group of the titanium oxide particle does not occur. In addition, ionization of the hydroxy group derived from silica on the surface of the titanium oxide is not promoted, and an electrostatic repulsive force between the titanium oxide particles is not sufficiently obtained. It is thus difficult to re-dissolve the dried ink, and the sticking recovery property of the ink is not obtained.

The titanium oxide particle on which the poly(acrylic acid) is adsorbed is negatively charged because of the carboxylic acid group of the poly(acrylic acid) in addition to the surface hydroxy group derived from silica. This further strengthens the electrostatic repulsive force between the titanium oxide particles, thereby enabling stable dispersion. Furthermore, even if the distance between the titanium oxide particles is reduced, the spacer function of the poly(acrylic acid) can inhibit the particles from approaching closer than a certain distance. This can suppress strong aggregation of the titanium oxide particle to improve the sedimentation recovery property of the pigment and the sticking recovery property of the ink. When the titanium oxide particle is not covered with alumina, there are no adsorption sites for the poly(acrylic acid). Thus, the above-described action that should be obtained by the adsorption of the poly(acrylic acid) does not occur, and the sedimentation recovery property of the pigment cannot be obtained. In the case where the titanium oxide particle is covered with only alumina, although the poly(acrylic acid) is adsorbed, no surface hydroxy groups derived from silica are present. Thus, the electrostatic repulsive force between the titanium oxide particles is not sufficiently obtained, failing to provide the sedimentation recovery property of the pigment.

The poly(acrylic acid) content of the ink is 0.05 times or more to 0.40 times or less the alumina content in terms of a mass ratio. This alumina covers the titanium oxide. When the mass ratio is within the above range, the poly(acrylic acid) can be adsorbed on the titanium oxide particle to improve the sedimentation recovery property of the pigment and the sticking recovery property of the ink. When the mass ratio is less than 0.05 times, the amount of poly(acrylic acid) adsorbed is insufficient, and the positive charge on the surface of the titanium oxide particle cannot be sufficiently cancelled, thus failing to obtain the sedimentation recovery property of the pigment or the sticking recovery property of the ink. When the mass ratio is more than 0.40 times, the poly(acrylic acid) is present in an amount exceeding the amount that can be adsorbed on the titanium oxide particle, and the amount of free poly(acrylic acid) in the ink increases. The free poly(acrylic acid) contributes to an increase in the amount of ions in the ink to cause destabilization of the dispersion state of the titanium oxide particle, thereby failing to obtain the sedimentation recovery property of the pigment.

In an embodiment of the present disclosure, the poly (acrylic acid) can cancel the positive charge of the surface hydroxy group derived from alumina by the configuration in which the poly(acrylic acid) is adsorbed on the titanium oxide particle containing titanium oxide whose surface is covered with alumina and silica. Thus, even if the distance between the titanium oxide particles is reduced because of sedimentation or drying, the aggregation due to the electrostatic action can be suppressed, and the spacer function of the poly(acrylic acid) prevents the titanium oxide particles from approaching closer than a certain distance, thereby suppressing the aggregation of the titanium oxide particles. Moreover, the presence of the potassium ion in the ink can promote the ionization of the carboxylic acid group of the poly(acrylic acid) and the surface hydroxy group of the titanium oxide particle. That is, the amount of free poly (acrylic acid) can be reduced. As a result, destabilization of the dispersed state of the titanium oxide particle is suppressed, thereby suppressing aggregation of the titanium oxide particle. In an embodiment of the present disclosure, by satisfying these configurations, it is possible to improve the sedimentation recovery property of the pigment and the sticking recovery property of the ink.

Aqueous Ink

The ink according to an embodiment of the present disclosure is an aqueous ink for ink jet recording, the aqueous ink containing a titanium oxide particle covered with a specific inorganic oxide, a poly(acrylic acid) and a potassium ion. This ink can be a white ink because titanium oxide is a white pigment. The following is a detailed description of the components contained in the ink according to an embodiment of the present disclosure, the physical properties of the ink and so forth.

Coloring Material

The ink contains, as a coloring material (pigment), a titanium oxide particle containing titanium oxide subjected to surface treatment with a specific inorganic oxide. That is, the ink contains titanium oxide particle containing titanium oxide whose surface is covered with a specific inorganic oxide. The titanium oxide particle content of the ink is preferably 0.10% by mass or more to 20.00% by mass or less based on the total mass of the ink. The titanium oxide particle content of the ink is more preferably 1.00% by mass or more to 20.00% by mass or less based on the total mass of the ink. The titanium oxide particle content of the ink is particularly preferably 1.00% by mass or more to 15.00% by mass or less based on the total mass of the ink.

Titanium oxide is a white pigment and has three crystal forms: rutile, anatase and brookite. Of these, rutile-type titanium oxide can be used. Industrial production methods for titanium dioxide include a sulfuric acid method and a chlorine method. Titanium oxide used in an embodiment of the present disclosure may be produced by any production method.

The 50% cumulative particle size (hereinafter, also referred to as an "average particle size") of the titanium oxide particle on a volume basis is preferably 200 nm or more to 500 nm or less. In particular, the 50% cumulative particle size of the titanium oxide particle on a volume basis is more preferably 200 nm or more to 400 nm or less. The 50% cumulative particle size ($D_{50}$) of the titanium oxide particle on a volume basis is a particle diameter at a cumulative volume of 50% when integrated from the small particle size side based on the total volume of the measured particles in a cumulative particle size curve. The $D_{50}$ of titanium oxide can be measured, for example, under the conditions of SetZero: 30 seconds, number of measurements: 3 times, measurement time: 180 seconds, shape: non-spherical, refractive index: 2.60. As a particle size distribution measurement apparatus, a particle size analyzer based on a dynamic light scattering method can be used. Of course, the measurement conditions and the like are not limited to those described above.

Titanium oxide subjected to surface treatment with alumina and silica is used. Surface treatment should suppress photocatalytic activity and improve dispersibility. In this specification, "alumina" is a generic term for oxides of aluminum, such as aluminum oxide. In this specification, "silica" is a generic term for silicon dioxide and substances composed of silicon dioxide. Most of the alumina and silica covering the titanium oxide are present in the form of aluminum oxide and silicon dioxide.

The proportion of titanium oxide in the titanium oxide particle can be 90.00% by mass or more based on the total mass of the titanium oxide particle. The proportion of titanium oxide in the titanium oxide particle can be 98.50% by mass or less based on the total mass of the titanium oxide particle. The proportion of alumina in the titanium oxide particle is 0.50 times or more to 1.00 time or less the proportion of silica in terms of a mass ratio. A mass ratio of less than 0.50 times results in a too small proportion of alumina; thus, the poly(acrylic acid) cannot be sufficiently adsorbed in the ink, and the dispersion stability or the like that should be obtained by the adsorption of the poly(acrylic acid) cannot be sufficiently obtained. This may lead to an insufficient sedimentation recovery property of the pigment. A mass ratio of more than 1.00 time results in a too large proportion of the alumina; thus, the aggregation of the titanium oxide particle is likely to occur because of the positive charge of the alumina-derived surface hydroxy group which cannot be cancelled by the poly(acrylic acid). This may fail to obtain a sufficient sedimentation recovery property of the pigment or a sufficient sticking recovery property of the ink. The proportion of alumina in the titanium oxide particle is preferably 0.50% by mass or more to 4.00% by mass or less based on the total mass of the titanium oxide particle. The proportion of alumina in the titanium oxide particle is more preferably 1.00% by mass or more to 4.00% by mass or less based on the total mass of the titanium oxide particle. A proportion of the alumina of less than 0.50% by mass may result in insufficient electrostatic action with poly(acrylic acid), sometimes failing to obtain a sufficient sedimentation recovery property of the pigment or a sufficient sticking recovery property of the ink. At a proportion of the alumina of more than 4.00% by mass, the aggregation of the titanium oxide particle occur easily because of the positive charge of the alumina-derived surface hydroxy group which cannot be cancelled by the poly(acrylic acid). This may fail to obtain a sufficient sedimentation recovery property of the pigment or a sufficient sticking recovery property of the ink. The proportion of silica in the titanium oxide particle can be 1.00% by mass or more to 4.00% by mass or less based on the total mass of the titanium oxide particle. When the proportion of the silica is within the above range, the electrostatic repulsion of a negative charge due to the silica-derived surface hydroxy group can be obtained. Moreover, even when a silane compound described below is used, the reactivity with the silane compound is appropriately adjusted, and the aggregation of the titanium oxide particle can be further suppressed. This can further improve the sedimentation recovery property of the pigment and the sticking recovery property of the ink.

As a method of measuring the proportions of alumina and silica in the titanium oxide particle, that is, the coating amounts of alumina and silica, for example, quantitative analysis of aluminum and silicon elements by inductively coupled plasma (ICP) optical emission spectrometry can be performed. In this case, calculation can be performed by assuming that all atoms covering the surface are in the form of oxides and converting the obtained aluminum and silicon values into their oxides, i.e., alumina and silica. The proportion of the aluminum element in the titanium oxide particle can be 0.57 times or more to 1.13 times or less the proportion of the silicon element in the titanium oxide particle in terms of a mass ratio, the proportions being obtained by inductively coupled plasma-optical emission spectrometry. When these values are converted on the basis of their oxides, i.e., alumina and silica, the proportion of alumina in the titanium oxide particle is 0.50 times or more to 1.00 time or less the proportion of silica in the titanium oxide particle in terms of a mass ratio.

Examples of a surface treatment method of titanium oxide include wet treatment and dry treatment. For example, the surface treatment can be performed by dispersing titanium oxide in a liquid medium and then allowing the titanium oxide to react with a surface treatment agent, such as sodium aluminate and sodium silicate. The surface treatment can be adjusted to desired characteristics by appropriately changing the proportions of the surface treatment agents. In addition to alumina and silica, inorganic oxides, such as zinc oxide and zirconia, and organic substances, such as polyols, can be used for the surface treatment as long as the advantageous effects of the present disclosure are not impaired.

The ink may contain an additional pigment other than titanium oxide as long as the advantageous effects of the present disclosure are not impaired. In this case, a color ink other than a white ink can also be used. The additional pigment content of the ink is preferably 0.10% by mass or more to 5.00% by mass or less, more preferably 0.10% by mass or more to 1.00% by mass or less, based on the total mass of the ink.

Poly(Acrylic Acid)

The ink contains poly(acrylic acid). The poly(acrylic acid) has the effect of assisting the dispersion of the titanium oxide particle. The poly(acrylic acid) content of the ink is preferably 0.01% by mass or more to 0.50% by mass or less, more preferably 0.01% by mass or more to 0.20% by mass or less, based on the total mass of the ink. A poly(acrylic acid) content of less than 0.01% by mass can result in a failure to cancel the positive charge on the surface of the titanium oxide particle, sometimes leading to an insufficient sedimentation recovery property of the pigment and an insufficient sticking recovery property of the ink. When the poly(acrylic acid) content is more than 0.50% by mass, the poly(acrylic acid) is present in an amount equal to or more than the amount that can be adsorbed on the titanium oxide particle. Thus, salting-out occurs easily because of the free poly(acrylic acid). As a result, the dispersion of the titanium oxide particle is considered to be unstable, causing aggregation. For this reason, the sedimentation recovery property of the pigment and the sticking recovery property of the ink are not sufficiently obtained, in some cases.

The poly(acrylic acid) is a compound having a structure in which multiple carboxylic acid groups are attached to every other carbon atom constituting a hydrocarbon chain. The poly(acrylic acid) can be suitably used whether it is a commercially available product or a synthesized compound. As a method for synthesizing the poly(acrylic acid), any known synthesis method may be employed. The poly (acrylic acid) can be synthesized, for example, by polymerization of acrylic acid. The carboxylic acid group of poly(acrylic acid) may be in acid or salt form. In the case of a salt form, examples thereof include salts of alkali metals, such as lithium, sodium and potassium, and salts of (organic) ammonium. From the viewpoint of storage stability of the ink, the poly(acrylic acid) can be a salt form of an alkali metal.

The weight-average molecular weight of the poly(acrylic acid) is preferably 1,000 or more to 6,000 or less. The weight-average molecular weight of the poly(acrylic acid) is more preferably 1,000 or more to 5,000 or less. The weight-average molecular weight of the poly(acrylic acid) is particularly preferably 1,000 or more to 3,000 or less. At a weight-average molecular weight of the poly(acrylic acid) of less than 1,000, even if the poly(acrylic acid) is adsorbed on the titanium oxide particle, the action as a spacer for suppressing the approach between the titanium oxide particles is weak because of its too small molecular size. For this reason, when the titanium oxide particles sedimented, the titanium oxide particles approach each other to promote aggregation, and the precipitation recovery property of the pigment is not sufficiently obtained, in some cases. At a weight-average molecular weight of the poly(acrylic acid) of more than 6,000, the carboxylic acid groups are considered to be adsorbed on the surfaces of the multiple titanium oxide particles because of the too large molecular size of the poly(acrylic acid), thereby causing the multiple titanium oxide particles to be cross-linked with the poly(acrylic acid). In this case, the titanium oxide particle may be aggregated because of the crosslinking of the poly(acrylic acid) to fail to sufficiently obtain the sedimentation recovery property of the pigment and the sticking recovery property of the ink.

Monovalent Cation

The ink contains a potassium ion, which is a monovalent cation. The term "monovalent cation" used in this specification refers to an alkali metal ion, an ammonium ion and organic ammonium, and does not include a proton ($H^+$). The potassium ion promotes the ionization of the carboxylic acid group of the poly(acrylic acid). To efficiently promote the ionization of the carboxylic acid group of the poly(acrylic acid), the potassium ion content of the ink can be 300 ppm or more based on the total mass of the ink. At a potassium ion content of less than 300 ppm, the amount of potassium ion in the ink is too small to sufficiently promote ionization of the carboxylic acid group of the poly(acrylic acid) and the surface hydroxy group of the titanium oxide particle. Thus, the re-dissolution of the dried ink composition does not easily occur, and the sticking recovery property of the ink is not sufficiently obtained, in some cases.

To incorporate a potassium ion to the ink, for example, a compound that generates a potassium ion by ionic dissociation may be added to the ink. Examples of such a compound include inorganic potassium salts and organic potassium salts. Examples of inorganic potassium salts include potassium halides, such as potassium fluoride, potassium chloride and potassium bromide; potassium salts of inorganic acids, such as potassium carbonate, potassium sulfate, potassium phosphate, potassium nitrate and potassium borate; potassium hydroxide; and potassium salts of organic acids, such as potassium acetate and potassium benzoate. Any of these salts may be added to the ink. The poly(acrylic acid), which is an essential component of the ink, may be used in the form of a potassium salt. A component other than poly(acrylic acid) may be used in the form of a potassium salt. A potassium ion may be contained in the ink by ionic dissociation of any of these potassium salts.

In addition to the potassium ion, the ink can contain a monovalent cation different from the potassium ion (hereinafter, referred to as an "additional monovalent cation"). In this case, the potassium ion content can be higher than the additional monovalent cation content. A potassium ion content equal to or less than the additional monovalent cation content results in the increase of ions having a smaller ionic radius and ionization tendency than the potassium ion. Thereby, the efficiency of promoting the ionization of the carboxylic acid group of the poly(acrylic acid) is slightly reduced, and the sticking recovery property of the ink is not sufficiently obtained, in some cases.

The total monovalent cation content of the ink can be 700 ppm or more to 1,300 ppm or less based on the total mass of the ink. The total monovalent cation content is the total of the potassium ion, which is an essential component of the ink, and the additional monovalent cation. At a total monovalent cation content of less than 700 ppm, the amount of monovalent cations that promote ionization of the carboxylic acid group of the poly(acrylic acid) and the surface hydroxy group of the titanium oxide particle in the ink is small. This leads to insufficient adsorption of the poly (acrylic acid) on the surface of the titanium oxide particle and a decrease in repulsive force such as electrostatic repulsive force between the titanium oxide particles. Thus, the sedimentation recovery property of the pigment is not sufficiently obtained, in some cases. At a total monovalent cation content of more than 1,300 ppm, the amount of monovalent cations is excessively large, causing aggregation due to salting-out. Thus, the sedimentation recovery property of the pigment is not sufficiently obtained, in some cases. When the ink contains a cation having a valence of two or higher, the cation content can be 10 ppm or less based on the total mass of the ink. The ink need not contain a cation with a valence of two or higher. The total monovalent cation content of the ink can be measured, for example, by quantifying the amounts of various monovalent cations contained by ICP optical emission spectrometry or ion chromatography.

Dispersant

The ink may contain a dispersant for dispersing the titanium oxide particle. In particular, the ink can contain a compound represented by the following formula (1). The amount of compound represented by formula (1) contained in the ink is preferably 0.01% by mass or more to 1.00% by mass or less, more preferably 0.02% by mass or more to 0.50% by mass or less, based on the total mass of the ink.

A subset of one or more $OR_1$ groups attached to the silicon atom in the compound represented by formula (1) is partially hydrolyzed in an aqueous medium to form a silanol group. Thus, the dispersant has an affinity for the silica-derived surface hydroxy group on the surface of the titanium oxide particle. The compound represented by formula (1) has, in addition to the moiety capable of forming a silanol group as described above, another moiety, serving as a repeating unit, ($(OR_4)_n$ in formula (1)) including n alkylene oxide groups each having 2 to 4 carbon atoms via X serving as a linking group. Hereinafter, the above moiety is also referred to as an "alkylene oxide chain". The alkylene oxide chain is hydrophilic. Thus, the alkylene oxide chain extends moderately in an aqueous medium and exhibits a repulsive force due to steric hindrance. Accordingly, the compound represented by formula (1) acts as a dispersant for the titanium oxide particle, (1)

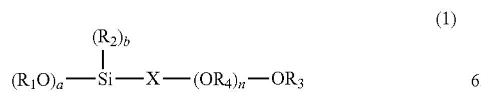

where in formula (1), $R_1$, $R_2$ and $R_3$ are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a+b=3.

In formula (1), $R_1$, $R_2$ and $R_3$ are each independently a hydrogen atom or an alkyl group having 1 to 4 carbon atoms. Examples of the alkyl group having 1 to 4 carbon atoms include a methyl group, an ethyl group, a n-propyl group, an i-propyl group and a n-butyl group. Among these, a methyl group can be used from the viewpoint of ease of hydrolysis. When each of $R_1$, $R_2$ and $R_3$ is an alkyl group having more than 4 carbon atoms, the compound is not easily hydrolyzed to form a silanol group, thereby failing to obtain an affinity for the titanium oxide particle. Thus, the titanium oxide particle cannot be stably dispersed, and the sedimentation recovery property of the pigment and the sticking recovery property of the ink are not sufficiently obtained, in some cases. Here, a representing the number of $R_1O$ is 1 to 3, b representing the number of $R_2$ is 0 to 2 and a+b=3. In particular, a can be 3, and b can be 0, that is, all three substituents on the silicon atom can be $R_1O$.

In formula (1), each $R_4$ is independently an alkylene group having 2 to 4 carbon atoms. Examples of the alkylene group having 2 to 4 carbon atoms include an ethylene group, a n-propylene group, an i-propylene group and n-butylene group. In particular, an ethylene group can be used. The number of $OR_4$, that is, n (average value) representing the number of an alkylene oxide group is 6 to 24. When n is less than 6, the length of the alkylene oxide chain is too short, and a repulsive force due to steric hindrance is not sufficiently obtained. Thereby, the sedimentation recovery property of the pigment and the sticking recovery property of the ink are not sufficiently obtained, in some cases. When n is more than 24, the length of the alkylene oxide chain is too long, so that the compound has higher hydrophilicity and is more likely to be present in free form in an aqueous medium. Thus, an affinity for the surface hydroxy group of the titanium oxide particle cannot be sufficiently obtained, and the aggregation of the titanium oxide particle is not efficiently suppressed, in some cases. Accordingly, the sedimentation recovery property of the pigment and the sticking recovery property of the ink are not sufficiently obtained, in some cases.

In formula (1), X is a single bond or an alkylene group having 1 to 6 carbon atoms. When X is a single bond, it means that the silicon atom and $OR_4$ are directly bonded to each other. Examples of the alkylene group having 1 to 6 carbon atoms includes a methylene group, an ethylene group, a n-propylene group, an i-propylene group, a n-butylene group, a n-pentylene group and a n-hexylene group. In particular, a n-propylene group can be used. When X is an alkylene group having more than 6 carbon atoms, the hydrophobicity of the compound represented by formula (1) is too high, and the effect of stably dispersing the titanium oxide particle is weak; thus, the sedimentation recovery property of the pigment and the sticking recovery property of the ink are not sufficiently obtained, in some cases.

The compound represented by formula (1) can be a compound represented by the following formula (2). The compound represented by formula (2) has three $OR_1$ groups attached to the silicon atom. Thus, the compound can be partially hydrolyzed in an aqueous medium to form three hydroxy groups attached to the silicon atom, thereby making it possible to increase portions each having an affinity for the titanium oxide particle. In addition, the compound represented by the following formula (2) has repeating units of an ethylene oxide group. Thus, the ethylene oxide chain is appropriately elongated in an aqueous medium, and a repulsive force due to steric hindrance can be obtained, (2)

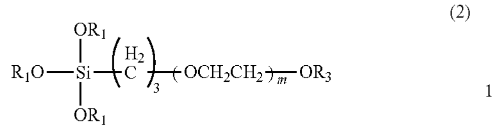

where in formula (2), $R_1$ and $R_3$ are each independently a hydrogen atom or an alkyl group having 1 to 4 carbon atoms, and m is 8 to 24.

The amount of the compound represented by formula (1) contained in the ink can be 0.002 times or more to 0.10 times or less the amount of the titanium oxide particle contained in the aqueous ink in terms of a mass ratio. When the mass ratio is less than 0.002 times, the effect of stably dispersing the titanium oxide particle is weak. Thus, the sedimentation recovery property of the pigment is not sufficiently obtained, in some cases. When the mass ratio is more than 0.10 times, the proportion of the compound represented by formula (1) is too high; thus, the intermolecular condensation (self-condensation) of the compound represented by formula (1) occurs easily. Accordingly, the compound represented by formula (1) is consumed without acting as a dispersant. In such a situation, the condensate of the compound represented by formula (1) is thought to act to form a denser aggregate of the titanium oxide particle, and the sticking recovery property of the ink is not sufficiently obtained, in some cases.

Resin

The ink can contain a resin. Examples of the resin include acrylic resins, urethane resins and urea resins. In particular, an acrylic resin can be used. The resin content of the ink is preferably 1.00% by mass or more to 25.00% by mass or less, more preferably 3.00% by mass or more to 15.00% by mass or less, even more preferably 5.00% by mass or more to 15.00% by mass or less, based on the total mass of the ink.

The resin can be contained in the ink for the purpose of improving various properties of recorded images, such as scratch resistance and concealability. Examples of the form of the resin include a block copolymer, a random copolymer, a graft copolymer and a combination of these copolymers. Moreover, the resin may be a water-soluble resin that is soluble in an aqueous medium, or may be a resin particle that is dispersed in an aqueous medium. The resin particle need not contain a coloring material.

In this specification, the "water-soluble resin" means that when the resin is neutralized with an alkali in an amount equivalent to the acid value of the resin, the resin is present in an aqueous medium in a state in which a particle whose particle size can be measured by a dynamic light scattering method is not formed. Whether the resin is soluble in water can be determined in accordance with the following method: First, a liquid (resin solid content: 10% by mass) containing a resin neutralized with an alkali (for example, sodium hydroxide or potassium hydroxide) equivalent to the acid value is prepared. The prepared liquid is diluted to 10 times (on a volume basis) with deionized water to prepare a sample solution. Then, when the particle size of the resin in the sample solution is measured by a dynamic light scattering method, if a particle having a particle size is not measured, the resin can be determined to be soluble in water. The measurement conditions at this time can be set as follows: for example, SetZero: 30 seconds, the number of measurements: 3 times and the measurement time: 180 seconds. As the particle size distribution measurement apparatus, for example, a particle size analyzer by a dynamic light scattering method (for example, trade name "UPA-EX150", available from Nikkiso Co., Ltd.) can be used. Of course, the particle size distribution measurement apparatus and measurement conditions used are not limited to those described above.

The acid value of the water-soluble resin is preferably 80 mgKOH/g or more to 250 mgKOH/g or less, more preferably 100 mgKOH/g or more to 200 mgKOH/g or less. When the resin particle is used, the acid value of the resin particle is preferably 0 mgKOH/g or more to 50 mgKOH/g or less. The weight-average molecular weight of the resin is preferably 1,000 or more to 30,000 or less, more preferably 5,000 or more to 15,000 or less. The weight-average molecular weight of the resin is a value measured by gel permeation chromatography (GPC) in terms of polystyrene.

Aqueous Medium

The ink is an aqueous ink containing water as an aqueous medium. The ink can contain water or an aqueous medium that is a mixed solvent of water and a water-soluble organic solvent. As the water, deionized water (ion-exchanged water) can be used. The water content of the ink can be 50.00% by mass or more to 95.00% by mass or less based on the total mass of the ink.

The water-soluble organic solvent is not particularly limited as long as it is water-soluble (it can dissolve in water at any ratio at 25° C.). Specific examples of the water-soluble organic solvent that can be used include monohydric or polyhydric alcohols, alkylene glycols, glycol ethers, nitrogen-containing polar compounds and sulfur-containing polar compounds. The water-soluble organic solvent content of the ink is preferably 3.00% by mass or more to 50.00% by mass or less, more preferably 10.00% by mass or more to 40.00% by mass or less, based on the total mass of the ink. At a water-soluble organic solvent content of more than 50.00% by mass, ink supply failure may occur.

Additional Additive

In addition to the above-described additives, the ink may contain various additives, such as a surfactant, a pH adjuster, a rust preventive, a preservative, an antifungal agent, an antioxidant, a reducing inhibitor, an evaporation promoter and a chelating agent, as needed. In particular, the ink can contain a surfactant. These additives can be used to provide an ink containing a potassium ion. The surfactant content of the ink is preferably 0.10% by mass or more to 5.00% by mass or less, more preferably 0.10% by mass or more to 2.00% by mass or less, based on the total mass of the ink. Examples of the surfactant include anionic surfactants, cationic surfactants and nonionic surfactants. Among these, a nonionic surfactant that has a low affinity for titanium oxide particle and that is effective even in a small amount can be used because the surfactant is used to adjust various physical properties of the ink.

Physical Properties of Ink

The ink is used for an ink jet recording method; thus, the physical properties thereof can be appropriately controlled. The surface tension of the ink at 25° C. is preferably 10 mN/m or more to 60 mN/m or less, more preferably 20 mN/m or more to 40 mN/m or less. The surface tension of the ink can be adjusted by appropriately determining the type and amount of the surfactant in the ink. The viscosity of the ink at 25° C. can be 1.0 mPa s or more to 10.0 mPa s or less. The pH of the ink at 25° C. can be 7.0 or more to 9.0 or less. The pH of the ink can be measured with a general-purpose pH meter equipped with, for example, a glass electrode.

Ink Applications

The ink according to an embodiment of the present disclosure described above contains the titanium oxide particle and thus can be used as a white ink. In this case, as described above, in order to express a clear color image even on a transparent recording medium, it is possible to apply the white ink in advance to perform undercoating treatment and then apply the color ink thereon, or apply the respective inks in the reverse order (what is called back printing). A color ink is an ink that contains a coloring material different from the titanium oxide particle and that exhibits a color, such as black, cyan, magenta or yellow. The color ink used in combination with the ink according to an embodiment of the present disclosure (hereinafter, also referred to simply as a "white ink") will be described in detail below.

Color Ink

Coloring Material

The color ink contains a coloring material other than the titanium oxide particle (hereinafter, also referred to as a "color pigment" or simply a "pigment" in order to distinguish it from white). The pigment content of the color ink is preferably 0.10% by mass or more to 15.00% by mass or less, more preferably 1.00% by mass or more to 10.00% by mass or less, based on the total mass of the ink.

Specific examples of the pigment include inorganic pigments, such as carbon black, and organic pigments, such as azo, phthalocyanine, quinacridone, isoindolinone, imidazolone, diketopyrrolopyrrole and dioxazine. In particular, carbon black and organic pigments can be used.

Examples of the dispersion type of pigment include a resin-dispersed pigment using a resin as a dispersant and a self-dispersible pigment in which a hydrophilic group is bonded to the particle surface of the pigment. Further examples thereof include a resin-bonded pigment in which an organic group containing a resin is chemically bonded to the particle surface of the pigment and a microcapsule pigment in which the particle surface of the pigment is covered with, for example, a resin. Of these, the resin-dispersed pigment in which a resin serving as a dispersant is physically adsorbed on the particle surface of the pigment can be used instead of the resin-bonded pigment or microcapsule pigment.

As the self-dispersible pigment, a pigment in which an anionic group, such as a carboxylic acid group, a sulfonic group or a phosphonic acid group, is bonded to the particle surface of a pigment directly or via another atomic group (—R—) can be used. The anionic group may be in any of an acid form and a salt form. When the anionic group is in a salt form, the anionic group may be in any of a state in which the anionic group is partially dissociated and a state in which the anionic group is completely dissociated. When the anionic group is in a salt form, examples of a cation serving as a counter ion include alkali metal cations, an ammonium ion and organic ammonium ions. Specific examples of the another atomic group (—R—) include a linear or branched alkylene group having 1 to 12 carbon atoms; an arylene group, such as a phenylene group or a naphthylene group; a carbonyl group; an imino group; an amide group; a sulfonyl group; an ester group; and an ether group. The group may be a group obtained by combining these groups.

Monovalent Cation

The color ink can contain a monovalent cation. Examples of the monovalent cation include alkali metal ions, an ammonium ion and organic ammonium. In particular, a potassium ion can be contained. The color ink may contain multiple monovalent cations. In this case, the monovalent cation content is the total amount of monovalent cations in the color ink. The monovalent cation content of the color ink can be 980 ppm or more to 6,500 ppm or less based on the total mass of the ink. When the monovalent cation content of the color ink is more than the above range, the storage stability of the color ink may fail to be obtained because of salting-out. When the color ink contains a cation having a valence of two or higher, the cation content can be 10 ppm or less based on the total mass of the ink. The color ink need not contain a cation with a valence of two or higher. The monovalent cation content of the color ink can be measured, for example, by quantifying the amounts of various monovalent cations contained by ICP optical emission spectrometry or ion chromatography.

To incorporate a monovalent cation to the color ink, for example, a compound that generates a monovalent cation by ion dissociation may be added to the ink. Examples of such a compound include alkali metal salts and ammonium salts. Examples of alkali metal salts include alkali metal salts of halogens, such as fluorine, chlorine and bromine; alkali metal salts of inorganic acids, such as carbonic acid, sulfuric acid, phosphoric acid, nitric acid and boric acid; alkali metal hydroxides; and alkali metal salts of organic acids, such as acetic acid and benzoic acid. Examples of the ammonium salt include ammonium salts of halogens, such as fluorine, chlorine and bromine; ammonium salts of inorganic acids, such as carbonic acid, sulfuric acid, phosphoric acid, nitric acid and boric acid; and ammonium salts of organic acids, such as acetic acid and benzoic acid.

The monovalent cation content $M_2$ of the color ink is preferably 1.40 times or more to 5.00 times or less the monovalent cation content $M_1$ of the white ink in terms of the ratio ($M_2M_1$). The ratio is more preferably 3.00 times or less. When the value of $M_2/M_1$ is in the range described above, the aggregation of the titanium oxide particle is appropriately adjusted, and a secondary color image having excellent color developability can be recorded.

Resin Dispersant

The color ink may contain a resin (resin dispersant) for dispersing a pigment. That is, the coloring material of the color ink can be a resin-dispersed pigment. The resin dispersant content of the color ink is preferably 1.00% by mass or more to 25.00% by mass or less, more preferably 3.00% by mass or more to 15.00% by mass or less, based on the total mass of the color ink. In particular, the resin dispersant content is 5.00% by mass or more to 15.00% by mass or less. When the dispersion type of pigment is self-dispersion, a resin dispersant need not be contained.

As the resin dispersant, a resin dispersant that can disperse a pigment in an aqueous medium by the action of an anionic group can be used. A water-soluble resin can be used as the resin dispersant. Examples thereof include acrylic resins, urethane resins, urea resins, polysaccharides and polypeptides. Of these, acrylic resins and urethane resins can be used. In particular, an acrylic resin containing units derived from (meth)acrylic acid and a (meth)acrylate can be used.

As the acrylic resins, acrylic resins having hydrophilic units and hydrophobic units as structural units are preferred. Among these, a resin having a hydrophilic unit derived from (meth)acrylic acid and a hydrophobic unit derived from at least one of a monomer having an aromatic ring and a (meth)acrylate is preferred. In particular, a resin having a hydrophilic unit derived from (meth)acrylic acid and a hydrophobic unit derived from at least one of a styrene monomer and an α-methylstyrene monomer is preferred.

These resins easily interact with pigments and thus can be suitably used as resin dispersants for dispersing pigments.

The hydrophilic unit is a unit having a hydrophilic group such as an anionic group or an ethylene oxide group. A hydrophilic unit can be formed, for example, by polymerizing a hydrophilic monomer having a hydrophilic group. Specific examples of the hydrophilic monomer having a hydrophilic group include acidic monomers having a carboxylic acid group, such as (meth)acrylic acid, itaconic acid, maleic acid and fumaric acid, and anionic monomers, such as anhydrides and salts of these acidic monomers. Examples of cations constituting salts of acidic monomers include ions, such as lithium, sodium, potassium, ammonium and organic ammonium ions. A monovalent cation obtained by ion dissociation of a salt of an acidic monomer may be contained in the color ink.

The hydrophobic unit is a unit that does not have a hydrophilic group such as an anionic group or an ethylene oxide group. The hydrophobic unit can be formed, for example, by polymerizing a hydrophobic monomer having no hydrophilic group described above. Specific examples of the hydrophobic monomer include aromatic ring-containing monomers, such as styrene, α-methylstyrene and benzyl (meth)acrylate; and (meth)acrylate monomers, such as methyl (meth)acrylate, butyl (meth)acrylate and 2-ethylhexyl (meth)acrylate.

The acid value of the resin used as a resin dispersant can be 0 mgKOH/g or more to 250 mgKOH/g or less. The weight-average molecular weight of the resin dispersant is preferably 1,000 or more to 30,000 or less, more preferably 5,000 or more to 15,000 or less. The weight-average molecular weight of the resin dispersant is a value measured by gel permeation chromatography (GPC) in terms of polystyrene.

Additional Resin

The color ink may contain a resin (additional resin) different from the resin dispersant. The additional resin content of the color ink can be 0.10% by mass or more to 5.00% by mass or less based on the total mass of the color ink. The additional resin can be contained in the color ink for the purpose of improving various properties of recorded images. Examples of the form of the resin include a block copolymer, a random copolymer, a graft copolymer and a combination of these copolymers. Moreover, the resin may be a water-soluble resin that is soluble in an aqueous medium, or may be a resin particle that is dispersed in an aqueous medium. The resin particle need not contain a coloring material.

The acid value of the additional resin can be 0 mgKOH/g or more to 250 mgKOH/g or less. The weight-average molecular weight of the additional resin is preferably 1,000 or more to 30,000 or less, more preferably 5,000 or more to 15,000 or less. The weight-average molecular weight of the additional resin is a value measured by gel permeation chromatography (GPC) in terms of polystyrene.

Aqueous Medium

The color ink is an aqueous ink containing water as an aqueous medium. The color ink can contain water or an aqueous medium that is a mixed solvent of water and a water-soluble organic solvent. As water, deionized water (ion-exchanged water) can be used. The water content of the color ink can be 50.00% by mass or more to 95.00% by mass or less based on the total mass of the ink.

The water-soluble organic solvent is not particularly limited as long as it is water-soluble (it can dissolve in water at any ratio at 25° C.). Specific examples of the water-soluble organic solvent that can be used include monohydric or polyhydric alcohols, alkylene glycols, glycol ethers, nitrogen-containing polar compounds and sulfur-containing polar compounds. The water-soluble organic solvent content of the color ink is preferably 3.00% by mass or more to 50.00% by mass or less, more preferably 10.00% by mass or more to 40.00% by mass or less, based on the total mass of the color ink. When a water-soluble organic solvent content is less than 3.00% by mass, the ink may stick in an ink jet recording apparatus and may have insufficient sticking resistance. When a water-soluble organic solvent content is more than 50.00% by mass, the ink has too high viscosity and lower flowability, possibly causing ink supply failure.

Additional Additive

In addition to the above-described additives, the color ink may contain various additives, such as a surfactant, a pH adjuster, a rust preventive, a preservative, an antifungal agent, an antioxidant, a reducing inhibitor, an evaporation promoter and a chelating agent, as needed. In particular, the color ink can contain a surfactant. The surfactant content of the color ink is preferably 0.10% by mass or more to 5.00% by mass or less, more preferably 0.10% by mass or more to 2.00% by mass or less, based on the total mass of the color ink. Examples of the surfactant include anionic surfactants, cationic surfactants and nonionic surfactants. Among these, a nonionic surfactant is used to adjust various physical properties of the color ink.

Physical Properties of Color Ink

The color ink is used for an ink jet recording method; thus, the physical properties thereof can be appropriately controlled. The surface tension of the color ink at 25° C. is preferably 10 mN/m or more to 60 mN/m or less, more preferably 20 mN/m or more to 40 mN/m or less. The surface tension of the color ink can be adjusted by appropriately determining the type and amount of the surfactant in the color ink. The viscosity of the color ink at 25° C. can be 1.0 mPa s or more to 10.0 mPa s or less. The pH of the color ink at 25° C. is preferably 7.0 or more to 11.0 or less, more preferably 7.0 or more to 9.0 or less. The pH of the color ink can be measured with a general-purpose pH meter equipped with, for example, a glass electrode.

Ink Cartridge

An ink cartridge according to an embodiment of the present disclosure includes an ink and an ink storage portion storing the ink. The ink contained in this ink storage portion is the above-described aqueous ink (white ink) according to an embodiment of the present disclosure. FIG. 1 is a cross-sectional view schematically illustrating an exemplary embodiment of an ink cartridge of the present disclosure. As illustrated in FIG. 1, an ink supply port 12 for supplying an ink to a recording head is provided on the bottom face of the ink cartridge. The interior of the ink cartridge is an ink storage portion for storing the ink. The ink storage portion includes an ink storage chamber 14 and an absorber storage chamber 16, which communicate with each other through a communication port 18. The absorber storage chamber 16 communicates with the ink supply port 12. The ink storage chamber 14 contains a liquid ink 20. The absorber storage chamber 16 receives absorbers 22 and 24 that hold the ink in an impregnated state. The ink storage portion may be configured to include an absorber that holds the total amount of ink stored without having an ink storage chamber for storing a liquid ink. The ink storage portion does not have an absorber, and may be configured to store the total amount of ink in a liquid state. Furthermore, the ink cartridge may be configured to include an ink storage portion and a recording head.

Ink Jet Recording Method

The ink jet recording method according to an embodiment of the present disclosure is a method for recording an image on a recording medium by ejecting the above-described aqueous ink according to an embodiment of the present disclosure from an ink jet recording head. Examples of a method for ejecting an ink include a method for applying mechanical energy to an ink and a method for applying thermal energy to an ink. In an embodiment of the present disclosure, a method for ejecting an ink by applying thermal energy to the ink can be employed. Steps included in the ink jet recording method may be the same as known steps, except that the ink according to an embodiment of the present disclosure is used. For example, when an image is recorded with the white ink, the method can be employed to a general-purpose ink jet recording method as it is. When undercoating treatment for a color ink is performed with the white ink, an image may be recorded by applying the color ink (for example, an ink of black, cyan, magenta or yellow) so as to overlap at least part of a region to which the white ink is applied. In addition, the undercoating treatment can also be used for back printing in which the white ink is applied so as to overlap at least part of a region to which a color ink is applied. The recording medium is not particularly limited, but since the aqueous ink according to an embodiment of the present disclosure can be used as a white ink, a transparent or colored recording medium can be used. The recording medium may be a poorly absorbable medium (non-absorbable medium), such as a resin film having low liquid medium absorbency.

Figure 2A:
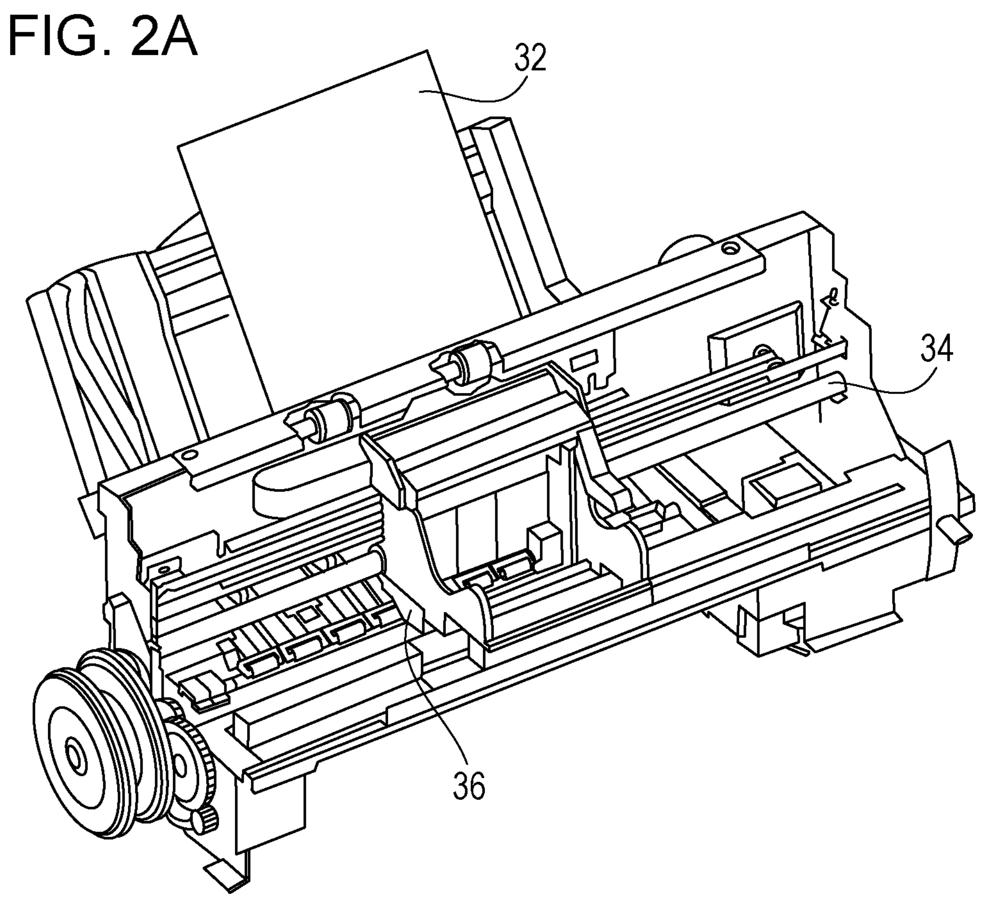
FIG. 2A is a perspective view schematically illustrating an example of a principal part of an ink jet recording apparatus used in an ink jet recording method according to the present disclosure.
Figure 2B:
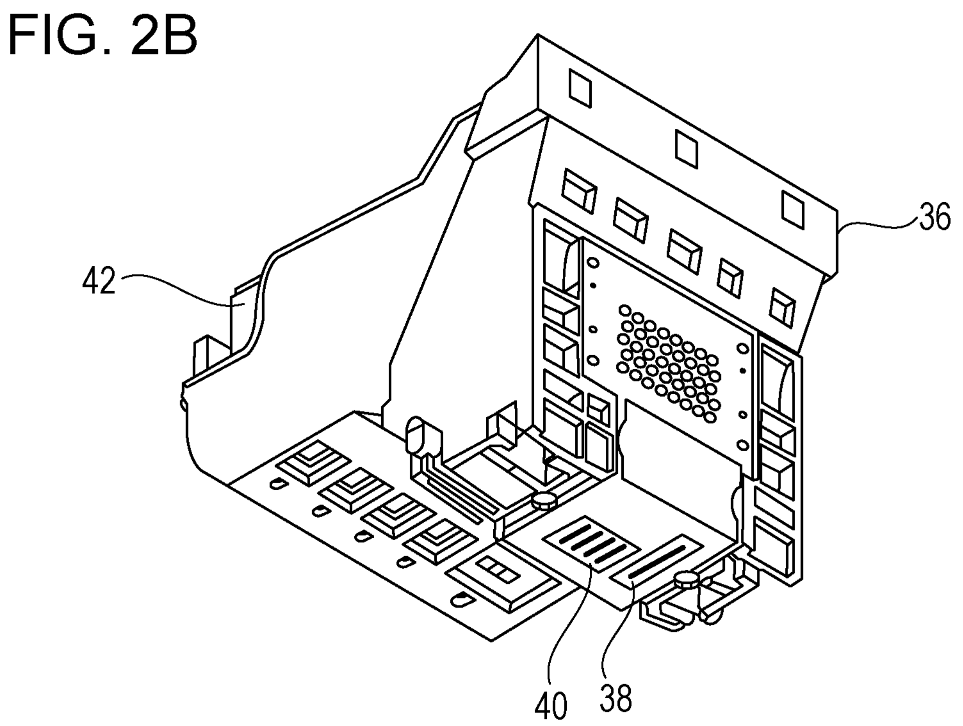
FIG. 2B is a perspective view schematically illustrating an example of a head cartridge used in an ink jet recording method according to the present disclosure.

FIG. 2A is a perspective view schematically illustrating an example of a principal part of an ink jet recording apparatus used in an ink jet recording method according to the present disclosure, and FIG. 2B is a perspective view schematically illustrating an example of a head cartridge used in an ink jet recording method according to the present disclosure. The ink jet recording apparatus includes a conveyance unit (not illustrated) configured to convey a recording medium 32; and a carriage shaft 34. A head cartridge 36 can be mounted on the carriage shaft 34. The head cartridge 36 includes recording heads 38 and 40, and is configured in such a manner that an ink cartridge 42 is set therein. While the head cartridge 36 is conveyed along the carriage shaft 34 in the main scanning direction, an ink (not illustrated) is ejected from the recording heads 38 and 40 toward the recording medium 32. Then the recording medium 32 is conveyed in the sub-scanning direction with a conveyance unit (not illustrated), thereby recoding an image on the recording medium 32.

Multipass recording can be used in which the ink is applied to the unit region of the recording medium in multiple relative scans of the recording heads and the recording medium. In particular, the application of white ink to the unit area and the application of color ink thereto can be performed in different relative scans. This allows more time for the inks to come into contact with each other, and mixing is more likely to be suppressed. The unit region can be set as any region, such as one pixel or one band.

EXAMPLES

Hereinafter, the present disclosure will be described in more detail by way of examples and comparative examples. The present disclosure is not limited to the following examples as long as it is within the scope of the present disclosure. Regarding the amounts of components, "part(s)" and "%" are on a mass basis, unless otherwise specified. A titanium oxide particle dispersion is referred to as a "pigment dispersion liquid".

Preparation of Titanium Oxide

Commercially available titanium oxide particles subjected to surface treatment in advance and titanium oxide particles prepared by subjecting untreated titanium oxide to surface treatment were used. The 50% cumulative particle size ($D_{50}$) of the titanium oxide particles on a volume basis was measured with a particle size analyzer (trade name: "Nanotrac WaveII-EX150", available from MicrotracBEL Corp.) by a dynamic light scattering method. Table 1 presents the properties of the titanium oxide particles. In Table 1, TITANIX: JR, JR-403, JR-405 and JR-600A are trade names of rutile-type titanium oxide available from Tayca Corporation.

Measurement of Coating Amount of Alumina and Silica

The proportions of alumina and silica in the titanium oxide particle, that is, the coating amounts of alumina and silica were measured as follows: A liquid obtained by adding the prepared titanium oxide particle to nitric acid was used as a sample. Quantitative analysis of aluminum and silicon elements was performed with an inductively coupled plasma (ICP) optical emission spectrometer. At this time, assuming that all the atoms covering the surface of the titanium oxide were in the form of oxides, the obtained values of aluminum and silicon were converted into values on the basis of oxides, that is, alumina and silica, and the mass ratio was calculated.

Titanium Oxide Particles 1, 3 to 6, 8 and 10

The surface treatment of titanium oxide was performed by a wet process to produce each titanium oxide particle. In the surface treatment by the wet process, untreated titanium oxide was brought into contact with surface treatment agents (for example, sodium aluminate and sodium silicate). In the surface treatment, the amounts and proportions of the surface treatment agents used were appropriately adjusted to achieve desired ratios.

Specifically, 300 parts of non-surface-treated rutile-type titanium oxide (trade name: "TITANIX JR", available from Tayca Corporation) and 700 parts of deionized water were mixed using a homogenizer. The temperature was increased to 90° C. while agitating. Potassium hydroxide (pH adjuster) was added to adjust the pH to 10.5. Sodium silicate was added thereto. Dilute sulfuric acid (pH adjuster) was added over about 1 hour to adjust the pH to 5.0. The reaction was continued for about 1 hour. Then sodium aluminate was added at 90° C. in small amounts. To maintain the pH, dilute sulfuric acid was used in combination to maintain the pH at 6.0 or more to 8.0 or less. After the addition of sodium aluminate, the reaction was continued for about 1 hour to obtain a dispersion. The dispersion was cooled to 25° C., purified by repeating sedimentation with a centrifugal separator and re-dispersion in ion-exchanged water and dried at 120° C. to obtain each titanium oxide particle surface-treated with at least one of alumina and silica. Table 1 presents the properties of each titanium oxide particle.

Titanium Oxide Particles 2, 7, 9 and 11

As titanium oxide particles 2, 7, 9 and 11, commercially available titanium oxide particles (including those previously surface-treated with alumina and/or silica) were used. Table 1 also presents the properties of titanium oxide particles 2, 7, 9 and 11. Some commercially available titanium oxide particles contained inorganic oxides, such as zirconia and zinc oxide, and organic compounds, such as polyol, in addition to alumina and silica, but the proportion thereof was about 1.0% at most. Thus, these were collectively included in the proportion T (%) of titanium oxide in the titanium oxide particle ("Titanium oxide T (%)" in Table 1), for convenience.

TABLE 1

| Properties of titanium oxide particle | | | | | | | | | | |
|---|---|---|---|---|---|---|---|---|---|---|
| | | Proportion in titanium oxide particle (%) | | | | | | | | |
| Titanium oxide particle | Type | Titanium oxide T (%) | Aluminum element a (%) | Alumina A (%) | Silicon element s (%) | Silica S (%) | Value of a/s (times) | Value of A/S (times) | $D_{50}$ (nm) |
| 1 | Sample prepared by surface-treating "TITANIX JR" (trade name) | 94.9 | 1.1 | 2.0 | 1.4 | 3.1 | 0.73 | 0.65 | 290 |
| 2 | "TITANIX JR-403" (trade name) | 95.7 | 1.1 | 2.0 | 1.1 | 2.3 | 0.98 | 0.87 | 250 |
| 3 | Sample prepared by surface-treating "TITANIX JR" (trade name) | 94.2 | 1.0 | 1.9 | 1.8 | 3.9 | 0.55 | 0.49 | 290 |
| 4 | Sample prepared by surface-treating "TITANIX JR" (trade name) | 94.3 | 1.0 | 1.9 | 1.8 | 3.8 | 0.57 | 0.50 | 290 |
| 5 | Sample prepared by surface-treating "TITANIX JR" (trade name) | 96.0 | 1.1 | 2.0 | 0.9 | 2.0 | 1.13 | 1.00 | 290 |
| 6 | Sample prepared by surface-treating "TITANIX JR" (trade name) | 95.9 | 1.1 | 2.1 | 0.9 | 2.0 | 1.19 | 1.05 | 290 |
| 7 | "TITANIX JR" (trade name) | 100.0 | 0.0 | 0.0 | 0.0 | 0.0 | — | — | 270 |
| 8 | Sample prepared by surface-treating "TITANIX JR" (trade name) | 98.5 | 0.0 | 0.0 | 0.7 | 1.5 | 0.00 | 0.00 | 290 |
| 9 | "TITANIX JR-405" (trade name) | 99.1 | 0.5 | 0.9 | 0.0 | 0.0 | — | — | 210 |
| 10 | Sample prepared by surface-treating "TITANIX JR" (trade name) | 99.2 | 0.1 | 0.1 | 0.3 | 0.7 | 0.16 | 0.14 | 230 |
| 11 | "TITANIX JR-600A" (trade name) | 98.2 | 1.0 | 1.8 | 0.0 | 0.0 | — | — | 360 |

Preparation of Compound Represented by Formula (1)

The compound represented by formula (1) was synthesized by the following procedure. Synthesis conditions of compounds synthesized as compounds represented by formula (1) and comparative compounds are given in Table 2, and the structures thereof are given in Table 3. The compound represented by formula (1) can be synthesized by allylation and hydrosilylation of a raw material (for example, a polyalkylene glycol monoalkyl ether).

A raw material, a base and a solvent listed in Table 2 were fed into a three-necked flask equipped with a stirring bar and a nitrogen inlet. The mixture was stirred at 25° C. for 30 minutes. As "sodium hydride", a 60% dispersion liquid of sodium hydride in paraffin was used. The dispersion was used so as to achieve the amount of sodium hydride given in Table 2. The mixture was stirred at 25° C. while the bromide described in Table 2 was added dropwise. The stirring was continued for another 12 hours after the completion of the dropwise addition, thereby preparing a mixture containing a reaction product. After unreacted sodium hydride and a neutralized product (sodium bromide) were separated by filtration from the mixture containing the reaction product, THF was removed under reduced pressure to give a concentrate. The concentrate was dissolved in 500 parts of deionized water. This aqueous solution was extracted three times with 200 mL of hexane, and then extracted with 200 mL of dichloromethane. The solvent containing the product was dried over magnesium sulfate and evaporated under reduced pressure to give each allylated compound (allylation step).

The allylated raw material and a silane compound given in Table 2 were fed into a passivated, dry round-bottom flask equipped with a stirring bar and an argon inlet. The mixture was stirred at 85° C. Then, 0.54 parts of a 65 mmol/L solution of chloroplatinic acid monohydrate in isopropyl alcohol and water was added thereto. The mixture was heated at 85° C. for 5 hours. After the completion of the reaction, the mixture was allowed to cool to 25° C. The excess silane compound was removed under reduced pressure. The residue was purified by column chromatography using a silica gel, which had been passivated with triethoxysilane, as a support to obtain each compound (hydrosilylation step). In the purification by the column chromatography, an eluent of ethyl acetate/hexane/ethanol=85/15/5 (volume basis) was used.

TABLE 2

| Synthesis conditions of compound represented by formula (1) | | | | | | | | | | | |
|---|---|---|---|---|---|---|---|---|---|---|---|
| | Allylation step | | | | | | | | Hydrosilylation step | | |
| | Raw material | | Base | | Solvent | | Bromide | | Allylated raw material | Silane compound | |
| Compound | Type | Amount used (parts) | Type | Amount used (parts) | Type | Amount used (parts) | Type | Amount used (parts) | Amount used (parts) | Type | Amount used (parts) |
| 1 | polyethylene glycol monomethyl ether (n = 10) | 28.3 | sodium hydride | 2.9 | THF | 200 | allyl bromide | 8.7 | 6.1 | trimethoxysilane | 18.4 |
| 2 | polyethylene glycol monomethyl ether (n = 10) | 28.3 | sodium hydride | 2.9 | THF | 200 | allyl bromide | 8.7 | 6.1 | triethoxysilane | 23.4 |

TABLE 2-continued

Synthesis conditions of compound represented by formula (1)

| | Allylation step | | | | | | | | Hydrosilylation step | | |
|---|---|---|---|---|---|---|---|---|---|---|---|
| | Raw material | | Base | | Solvent | | Bromide | | Allylated raw material | Silane compound | |
| Compound | Type | Amount used (parts) | Type | Amount used (parts) | Type | Amount used (parts) | Type | Amount used (parts) | Amount used (parts) | Type | Amount used (parts) |
| 3 | polyethylene glycol monomethyl ether (n = 6) | 17.8 | sodium hydride | 2.9 | THF | 200 | allyl bromide | 8.7 | 4.0 | trimethoxysilane | 18.4 |
| 4 | polyethylene glycol monomethyl ether (n = 24) | 49.5 | sodium hydride | 2.9 | THF | 200 | allyl bromide | 8.7 | 13.5 | trimethoxysilane | 18.4 |
| 5 (comparative) | glycidol | 4.4 | sodium hydride | 2.9 | THF | 200 | allyl bromide | 8.7 | 1.7 | trimethoxysilane | 18.4 |

TABLE 3

Structure of synthesized compound represented by formula (1)

| Compound | X | $R_1$ | $R_2$ | $R_3$ | $R_4$ | n | a | b | Compound name |
|---|---|---|---|---|---|---|---|---|---|
| 1 | n-propylene group | methyl group | — | methyl group | ethylene group | 10 | 3 | 0 | 3-(methoxy(oxyethylene10)) propyltrimethoxysilane |
| 2 | n-propylene group | ethyl group | — | methyl group | ethylene group | 10 | 3 | 0 | 3-(methoxy(oxyethylene10)) propyltriethoxysilane |
| 3 | n-propylene group | methyl group | — | methyl group | ethylene group | 6 | 3 | 0 | 3-(methoxy(oxyethylene6)) propyltrimethoxysilane |
| 4 | n-propylene group | methyl group | — | methyl group | ethylene group | 24 | 3 | 0 | 3-(methoxy(oxyethylene24)) propyltrimethoxysilane |
| 5 (comparative) | n-propylene group | methyl group | — | glycidyl group | methylene group | 1 | 3 | 0 | 3-glycidyloxypropyltrimethoxysilane |

Preparation of Pigment Dispersion

Pigment dispersions were produced by the following procedure. The production conditions of the pigment dispersions are given in Table 4.

Pigment Dispersions 1 to 20 and 22 to 24

As given in Table 4, 40.00 parts of the titanium oxide particle, a dispersant, a neutralizing agent and ion-exchanged water used in an amount such that the total amount of components was 100.00 parts were mixed. Preliminary dispersion treatment was performed with a homogenizer. Thereafter, dispersion treatment (main dispersion treatment) was performed at 25° C. for 12 hours with a paint shaker using 0.5-mm zirconia beads. When the neutralizing agent was used, the amount of neutralizing agent used was appropriately adjusted to achieve a pH of 10.5 in the main dispersion. The pH of the main dispersion was a value measured with a pH meter (trade name: "Portable pH Meter D-74", available from Horiba, Ltd.) at the time when the main dispersion treatment was started. The zirconia beads were separated by filtration. An appropriate amount of ion-exchanged water was added as necessary to prepare each pigment dispersion having a titanium oxide particle content of 40.00%. In Table 4, the "poly(acrylic acid)" of pigment dispersion 24 was synthesized by a method described below, had a weight-average molecular weight of 5,000 and was a potassium salt type.

Pigment Dispersion 21

A pigment dispersion was prepared according to a method for preparing a pigment 3 k in Example 3 of PCT Japanese Translation Patent Publication No. 2017-521348. Specifically, the pigment dispersion was prepared according to the method for producing the pigment dispersion 19 described above. The resulting pigment dispersion was dried by air blowing at 35° C. under stirring to remove water, and then dried in an oven at 105° C. for 4 hours and 15 minutes to obtain a titanium oxide particle powder. The titanium oxide particle powder was re-dispersed in an appropriate amount of ion-exchanged water to prepare pigment dispersion 21 having a titanium oxide particle content of 40.00%.

TABLE 4

Production conditions of pigment dispersion

| | | Dispersant | | |
|---|---|---|---|---|
| Pigment dispersion | Titanium oxide particle | Compound | Amount used (parts) | Neutralizing agent |
| 1 | 1 | 1 | 1.20 | potassium hydroxide |
| 2 | 2 | 1 | 1.20 | potassium hydroxide |
| 3 | 2 | 1 | 1.20 | sodium hydroxide |

TABLE 4-continued

| Production conditions of pigment dispersion | | | | |
|---|---|---|---|---|
| | | Dispersant | | |
| Pigment dispersion | Titanium oxide particle | Compound | Amount used (parts) | Neutralizing agent |
| 4 | 3 | 1 | 1.20 | potassium hydroxide |
| 5 | 4 | 1 | 1.20 | potassium hydroxide |
| 6 | 5 | 1 | 1.20 | potassium hydroxide |
| 7 | 6 | 1 | 1.20 | potassium hydroxide |
| 8 | 1 | — | 0.00 | potassium hydroxide |
| 9 | 1 | 2 | 1.20 | potassium hydroxide |
| 10 | 1 | 3 | 1.20 | potassium hydroxide |
| 11 | 1 | 4 | 1.20 | potassium hydroxide |
| 12 | 1 | 5 (comparative) | 1.20 | potassium hydroxide |
| 13 | 1 | 1 | 0.05 | potassium hydroxide |
| 14 | 1 | 1 | 0.08 | potassium hydroxide |
| 15 | 1 | 1 | 4.00 | potassium hydroxide |
| 16 | 1 | 1 | 4.50 | potassium hydroxide |
| 17 | 3 | — | 0.00 | potassium hydroxide |
| 18 | 7 | 1 | 1.20 | |
| 19 | 8 | 1 | 1.20 | potassium hydroxide |
| 20 | 9 | 1 | 1.20 | |
| 21 | 8 | 1 | 1.20 | potassium hydroxide |
| 22 | 10 | — | 0.00 | sodium hydroxide |
| 23 | 11 | — | 0.00 | |
| 24 | 1 | poly(acrylic acid) | 8.00 | potassium hydroxide |

Synthesis of Resin Particle

In a four-necked flask equipped with a stirrer, a reflux condenser and a nitrogen gas inlet, 0.2 parts of potassium persulfate and 74.0 parts of ion-exchanged water were placed. Nitrogen gas was then introduced thereinto. Monomers given in Table 5 and 0.3 parts of an emulsifier (trade name: "NIKKOL BC15", available from Nikko Chemicals Co., Ltd.) were mixed to prepare a mixture. The resulting mixture was added dropwise to the four-necked flask under stirring over 1 hour, and then reacted at 80° C. for 2 hours. The reaction mixture was cooled to 25° C. A neutralizing agent in an amount, by mole, equivalent to the acid value of the resin and an appropriate amount of ion-exchanged water were added to the reaction mixture to prepare aqueous dispersion of polymer particle 1 to 8 having a resin particle content of 40.0% and a 50% cumulative particle size of 100 nm on a volume basis. Table 5 presents the acid value of the resin particle. Details of each component in Table 5 are described below.

BMA: Butyl methacrylate

MAA: Methacrylic acid

TABLE 5

| Synthesis conditions and properties of resin particle | | | | |
|---|---|---|---|---|
| Resin | Monomer (parts) | | | Acid value |
| particle | BMA | MAA | Neutralizing agent | (mgKOH/g) |
| 1 | 98.5 | 1.5 | potassium hydroxide | 10.0 |
| 2 | 97.8 | 2.2 | potassium hydroxide | 14.3 |
| 3 | 99.7 | 0.3 | potassium hydroxide | 2.0 |
| 4 | 99.5 | 0.5 | potassium hydroxide | 3.4 |
| 5 | 96.8 | 3.2 | potassium hydroxide | 20.5 |
| 6 | 96.6 | 3.4 | potassium hydroxide | 22.0 |
| 7 | 97.8 | 2.2 | sodium hydroxide | 14.3 |
| 8 | 97.4 | 2.6 | potassium hydroxide | 16.6 |

Synthesis of Poly(Acrylic Acid)

Acrylic acid was polymerized in the usual manner to synthesize a poly(acrylic acid). The weight-average molecular weight was adjusted by adjusting the heating temperature and time during the polymerization. The carboxylic acid groups were converted into sodium salt, lithium salt, potassium salt and ammonium salt forms with sodium hydroxide, lithium hydroxide, potassium hydroxide and ammonia, respectively, used in amounts, by mole, equivalent to the acid values.

Preparation of Alumina Particle-Containing Liquid

An alumina particle-containing liquid was prepared by the following method. Specifically, an alumina particle dispersion containing an amphoteric alumina particle (trade name: "Dispal 23N4-80", dispersion particle diameter: 90 nm, available from Sasol) in an amount of 10% was provided. The pH of the alumina particle dispersion was adjusted to 4.0 with a strong acid (1 mol/L hydrochloric acid). The alumina particle dispersion was mixed using a propeller mixer until it became uniform, and pulverized with a bead mill to prepare a alumina particle-containing liquid (alumina particle content: 10%).

Preparation of Ink

Components of the types and amounts given in the upper rows of Tables 6 to 9 were mixed and stirred. Acetylenol E60 (trade name) is a nonionic surfactant available from Kawaken Fine Chemicals Co., Ltd. Proxel GXL(S) (trade name) is a preservative available from LONZA. Thereafter, pressure filtration was performed with a membrane filter (available from Sartorius) having a pore size of 5.0 μm to prepare each ink. In Tables 6 to 9, the weight-average molecular weight and the salt form of the poly(acrylic acid) are collectively described. For example, the description "poly(acrylic acid) (Mw: 1,500, Na salt)" indicates that the weight-average molecular weight is 1,500 and the poly (acrylic acid) is in a sodium salt form.

Calculation of Total Monovalent Cation Content of Ink

The total monovalent cation content of the ink was measured by ICP optical emission spectrometry. Specifically, each of the prepared inks was diluted with ion-exchanged water so as to have a pigment content of 0.04%. The amounts of various monovalent cations contained in the ink were quantified with an ICP optical emission spectrometer (trade name: "SPS5100 ICP-OES", available from SII). Among the monovalent cations, the ammonium ion concentration was measured with an ion chromatograph (trade name: "DX-320", available from Dionex). The total monovalent cation content (ppm) in the case of the titanium oxide particle content of the ink before dilution was calculated from the quantified monovalent cation content. Tables 6 to 9 collectively present the properties of each ink, the potassium ion content and the total monovalent cation content in the lower sections.

TABLE 6

Composition and properties of ink

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Type of pigment dispersion | 1 | 2 | 1 | 1 | 1 | 1 | 1 | 3 | 3 | 4 | 5 |
| Pigment dispersion | 37.50 | 37.50 | 37.50 | 37.50 | 37.50 | 37.50 | 37.50 | 37.50 | 37.50 | 37.50 | 37.50 |
| Poly(acrylic acid) (Mw: 500, Na salt) | | | | | | | | | | | |
| Poly(acrylic acid) (Mw: 1,000, Na salt) | | | | | | | | | | | |
| Poly(acrylic acid) (Mw: 2,000, Na salt) | 0.05 | 0.05 | 0.015 | 0.12 | | | 0.05 | 0.05 | 0.05 | 0.05 | 0.05 |
| Poly(acrylie acid) (Mw: 2,000, Li salt) | | | | | 0.05 | | | | | | |
| Poly(acrylic acid) (Mw: 2,000, $NH_4$ salt) | | | | | | 0.05 | | | | | |
| Poly(acrylic acid) (Mw: 3,500, Na salt) | | | | | | | | | | | |
| Poly(acrylic acid) (Mw: 6,000, Na salt) | | | | | | | | | | | |
| Poly(acrylic acid) (Mw: 10,000, Na salt) | | | | | | | | | | | |
| Aqueous dispersion of resin particle 1 | 25.00 | | 25.00 | 25.00 | 25.00 | 25.00 | 28.00 | | 10.00 | 25.00 | 25.00 |
| Aqueous dispersion of resin particle 2 | | 25.00 | | | | | | | | | |
| Aqueous dispersion of resin particle 3 | | | | | | | | | | | |
| Aqueous dispersion of resin particle 4 | | | | | | | | | | | |
| Aqueous dispersion of resin particle 5 | | | | | | | | | | | |
| Aqueous dispersion of resin particle 6 | | | | | | | | | | | |
| Aqueous dispersion of resin particle 7 | | | | | | | | | 15.00 | | |
| Aqueous dispersion of resin particle 8 | | | | | | | | 25.00 | | | |
| 1,2-Propanediol | 15.00 | 15.00 | 15.00 | 15.00 | 15.00 | 15.00 | 17.00 | 15.00 | 15.00 | 15.00 | 15.00 |
| 2-Pyrrolidone | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 | 0.90 |
| Proxel GXL(S) | 0.15 | 0.15 | 0.15 | 0.15 | 0.15 | 0.15 | 0.15 | 0.15 | 0.15 | 0.15 | 0.15 |
| Alumina particle-containing liquid | | | | | | | | | | | |
| Ion-exchanged water | 18.40 | 18.40 | 18.44 | 18.33 | 18.40 | 18.40 | 13.40 | 18.40 | 18.40 | 18.40 | 18.40 |
| Titanium oxide particle content T (%) | 15.00 | 15.00 | 15.00 | 15.00 | 15.00 | 15.00 | 15.00 | 15.00 | 15.00 | 15.00 | 15.00 |
| Amount of alumina covering surface of titanium oxide particle A (%) | 0.30 | 0.30 | 0.30 | 0.30 | 0.30 | 0.30 | 0.30 | 0.30 | 0.30 | 0.29 | 0.29 |
| Poly(acrylie acid) content P (%) | 0.05 | 0.05 | 0.02 | 0.12 | 0.05 | 0.05 | 0.05 | 0.05 | 0.05 | 0.05 | 0.05 |
| Value of P/A (times) | 0.17 | 0.17 | 0.05 | 0.40 | 0.17 | 0.17 | 0.17 | 0.17 | 0.17 | 0.17 | 0.17 |
| Amount of compound represented by formula (1) S (%) | 0.45 | 0.45 | 0.45 | 0.45 | 0.45 | 0.45 | 0.45 | 0.45 | 0.45 | 0.45 | 0.45 |
| Value of S/T (times) | 0.030 | 0.030 | 0.030 | 0.030 | 0.030 | 0.030 | 0.030 | 0.030 | 0.030 | 0.030 | 0.030 |
| Potassium ion content (ppm) | 928 | 929 | 928 | 928 | 928 | 928 | 970 | 582 | 141 | 1,077 | 1,059 |
| Total monovalent cation content (ppm) | 1,082 | 1,083 | 1,026 | 1,196 | 1,082 | 1,082 | 1,124 | 1,164 | 1,023 | 1,231 | 1,213 |

TABLE 7

Composition and properties of ink

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Type of pigment dispersion | 6 | 7 | 1 | 1 | 1 | 1 | 1 | 2 | 2 | 2 | 2 |
| Pigment dispersion | 37.50 | 37.50 | 37.50 | 37.50 | 37.50 | 37.50 | 37.50 | 37.50 | 37.50 | 37.50 | 37.50 |
| Poly (aery lie acid) (Mw: 500, Na salt) | | | 0.05 | | | | | | | | |
| Poly(acrylic acid) (Mw: 1,000, Na salt) | | | | 0.05 | | | | | | | |
| Poly (acrylic acid) (Mw: 2,000, Na salt) | 0.05 | 0.05 | | | | | | 0.05 | 0.05 | 0.05 | 0.05 |
| Poly(acrylie acid) (Mw: 2,000, Li salt) | | | | | | | | | | | |
| Poly (acrylic acid) (Mw: 2,000, $NH_4$ salt) | | | | | | | | | | | |
| Poly (acrylic acid) (Mw: 3,500, Na salt) | | | | | 0.05 | | | | | | |
| Poly (acrylic acid) (Mw: 6,000, Na salt) | | | | | | 0.05 | | | | | |
| Poly(acrylic acid) (Mw: 10,000, Na salt) | | | | | | | 0.03 | | | | |
| Aqueous dispersion of resin particle 1 | 25.00 | 25.00 | 25.00 | 25.00 | 25.00 | 25.00 | 25.00 | | | | |
| Aqueous dispersion of resin particle 2 | | | | | | | | | | | |
| Aqueous dispersion of resin particle 3 | | | | | | | | 25.00 | | | |
| Aqueous dispersion of resin particle 4 | | | | | | | | | 25.00 | | |
| Aqueous dispersion of resin particle 5 | | | | | | | | | | 25.00 | |
| Aqueous dispersion of resin particle 6 | | | | | | | | | | | 25.00 |
| Aqueous dispersion of resin particle 7 | | | | | | | | | | | |
| Aqueous dispersion of resin particle 8 | | | | | | | | | | | |
| 1,2-Propanediol | 15.00 | 15.00 | 15.00 | 15.00 | 15.00 | 15.00 | 15.00 | 15.00 | 15.00 | 15.00 | 15.00 |
| 2-Pyrrolidone | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 | 0.90 |
| Proxel GXL(S) | 0.15 | 0.15 | 0.15 | 0.15 | 0.15 | 0.15 | 0.15 | 0.15 | 0.15 | 0.15 | 0.15 |
| Alumina particle-containing liquid | | | | | | | | | | | |
| Ion-exchanged water | 18.40 | 18.40 | 18.40 | 18.40 | 18.40 | 18.40 | 18.42 | 18.40 | 18.40 | 18.40 | 18.40 |
| Titanium oxide particle content T (%) | 15.00 | 15.00 | 15.00 | 15.00 | 15.00 | 15.00 | 15.00 | 15.00 | 15.00 | 15.00 | 15.00 |
| Amount of alumina covering surface of titanium oxide particle A (%) | 0.30 | 0.32 | 0.30 | 0.30 | 0.30 | 0.30 | 0.30 | 0.30 | 0.30 | 0.30 | 0.30 |

TABLE 7-continued

| Composition and properties of ink | | | | | | | | | | | |
|---|---|---|---|---|---|---|---|---|---|---|---|
| | Example | | | | | | | | | | |
| | 12 | 13 | 14 | 15 | 16 | 17 | 18 | 19 | 20 | 21 | 22 |
| Poly(acrylie acid) content P (%) | 0.05 | 0.05 | 0.05 | 0.05 | 0.05 | 0.05 | 0.03 | 0.05 | 0.05 | 0.05 | 0.05 |
| Value of P/A (times) | 0.17 | 0.16 | 0.17 | 0.17 | 0.17 | 0.17 | 0.10 | 0.17 | 0.17 | 0.17 | 0.17 |
| Amount of compound represented by formula (1) S (%) | 0.45 | 0.45 | 0.45 | 0.45 | 0.45 | 0.45 | 0.45 | 0.45 | 0.45 | 0.45 | 0.45 |
| Value of S/T (times) | 0.030 | 0.030 | 0.030 | 0.030 | 0.030 | 0.030 | 0.030 | 0.030 | 0.030 | 0.030 | 0.030 |
| Potassium ion content (ppm) | 724 | 724 | 928 | 928 | 928 | 928 | 928 | 498 | 546 | 1,146 | 1,198 |
| Total monovalent cation content (ppm) | 878 | 878 | 1,082 | 1,082 | 1,163 | 1,082 | 1,050 | 652 | 700 | 1,300 | 1,352 |

TABLE 8

| Composition and properties of ink | | | | | | | | | | |
|---|---|---|---|---|---|---|---|---|---|---|
| | Example | | | | | | | | | |
| | 23 | 24 | 25 | 26 | 27 | 28 | 29 | 30 | 31 | 32 |
| Type of pigment dispersion | 8 | 9 | 10 | 11 | 12 | 13 | 14 | 15 | 16 | 17 |
| Pigment dispersion | 37.50 | 37.50 | 37.50 | 37.50 | 37.50 | 37.50 | 37.50 | 37.50 | 37.50 | 37.50 |
| Poly (aery lie acid) (Mw: 500, Na salt) | | | | | | | | | | |
| Poly(acrylic acid) (Mw: 1,000, Na salt) | | | | | | | | | | |
| Poly (acrylic acid) (Mw: 2,000, Na salt) | 0.05 | 0.05 | 0.05 | 0.05 | 0.05 | 0.05 | 0.05 | 0.05 | 0.05 | |
| Poly(acrylie acid) (Mw: 2,000, Li salt) | | | | | | | | | | |
| Poly (acrylic acid) (Mw: 2,000, NH4 salt) | | | | | | | | | | |
| Poly (acrylic acid) (Mw: 3,500, Na salt) | | | | | | | | | | |
| Poly (acrylic acid) (Mw: 6,000, Na salt) | | | | | | | | | | |
| Poly(acrylic acid) (Mw: 10,000, Na salt) | | | | | | | | | | 0.10 |
| Aqueous dispersion of resin particle 1 | 25.00 | 25.00 | 25.00 | 25.00 | 25.00 | 25.00 | 25.00 | 25.00 | 25.00 | |
| Aqueous dispersion of resin particle 2 | | | | | | | | | | |
| Aqueous dispersion of resin particle 3 | | | | | | | | | | |
| Aqueous dispersion of resin particle 4 | | | | | | | | | | |
| Aqueous dispersion of resin particle 5 | | | | | | | | | | |
| Aqueous dispersion of resin particle 6 | | | | | | | | | | |
| Aqueous dispersion of resin particle 7 | | | | | | | | | | 25.00 |
| Aqueous dispersion of resin particle 8 | | | | | | | | | | |
| 1,2-Propanediol | 15.00 | 15.00 | 15.00 | 15.00 | 15.00 | 15.00 | 15.00 | 15.00 | 15.00 | 15.00 |
| 2-Pyrrolidone | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | 0.90 | 0.90 |
| Proxel GXL(S) | 0.15 | 0.15 | 0.15 | 0.15 | 0.15 | 0.15 | 0.15 | 0.15 | 0.15 | 0.15 |
| Alumina particle-containing liquid | | | | | | | | | | |
| Ion-exchanged water | 18.40 | 18.40 | 18.40 | 18.40 | 18.40 | 18.40 | 18.40 | 18.40 | 18.40 | 18.35 |
| Titanium oxide particle content T (%) | 15.00 | 15.00 | 15.00 | 15.00 | 15.00 | 15.00 | 15.00 | 15.00 | 15.00 | 15.00 |
| Amount of alumina covering surface of titanium oxide particle A (%) | 0.30 | 0.30 | 0.30 | 0.30 | 0.30 | 0.30 | 0.30 | 0.30 | 0.30 | 0.29 |
| Poly(acrylie acid) content P (%) | 0.05 | 0.05 | 0.05 | 0.05 | 0.05 | 0.05 | 0.05 | 0.05 | 0.05 | 0.10 |
| Value of P/A (times) | 0.17 | 0.17 | 0.17 | 0.17 | 0.17 | 0.17 | 0.17 | 0.17 | 0.17 | 0.34 |
| Amount of compound represented by formula (1)S(%) | 0.00 | 0.45 | 0.45 | 0.45 | 0.45 | 0.02 | 0.03 | 1.50 | 1.69 | 0.00 |
| Value of S/T (times) | 0.000 | 0.030 | 0.030 | 0.030 | 0.030 | 0.001 | 0.002 | 0.100 | 0.113 | 0.000 |
| Potassium ion content (ppm) | 928 | 928 | 928 | 928 | 928 | 928 | 928 | 928 | 928 | 725 |
| Total monovalent cation content (ppm) | 1,082 | 1,082 | 1,082 | 1,082 | 1,082 | 1,082 | 1,082 | 1,082 | 1,082 | 1,461 |

TABLE 9

| Composition and properties of ink | | | | | | | | | | | |
|---|---|---|---|---|---|---|---|---|---|---|---|
| | Comparative example | | | | | | | | | | |
| | 1 | 2 | 3 | 4 | 5 | 6 | 7 | 8 | 9 | 10 | 11 |
| Type of pigment dispersion | 18 | 19 | 20 | 1 | 1 | 1 | 3 | 21 | 22 | 23 | 24 |
| Pigment dispersion | 37.50 | 37.50 | 37.50 | 37.50 | 37.50 | 37.50 | 37.50 | 37.50 | 41.25 | 30.00 | 25.00 |
| Poly(acrylic acid) (Mw: 500, Na salt) | | | | | | | | | | | |
| Poly(acrylic acid) (Mw: 1,000, Na salt) | | | | | | | | | | | |
| Poly(acrylic acid) (Mw: 2,000, Na salt) | 0.05 | 0.05 | 0.05 | | 0.012 | 0.13 | 0.05 | | | | |
| Poly(acrylie acid) (Mw: 2,000, Li salt) | | | | | | | | | | | |

TABLE 9-continued

| Composition and properties of ink | | | | | | | | | | | |
|---|---|---|---|---|---|---|---|---|---|---|---|
| | Comparative example | | | | | | | | | | |
| | 1 | 2 | 3 | 4 | 5 | 6 | 7 | 8 | 9 | 10 | 11 |
| Poly(acrylic acid) (Mw: 2,000, $NH_4$ salt) | | | | | | | | | | | |
| Poly(acrylic acid) (Mw: 3,500, Na salt) | | | | | | | | | 0.06 | | |
| Poly(acrylic acid) (Mw: 6,000, Na salt) | | | | | | | | | | | |
| Poly(acrylic acid) (Mw: 10,000, Na salt) | | | | | | | | | | | |
| Aqueous dispersion of resin particle 1 | 25.00 | 25.00 | 25.00 | 25.00 | 25.00 | 25.00 | | 25.00 | | 27.00 | |
| Aqueous dispersion of resin particle 2 | | | | | | | | | | | 25.00 |
| Aqueous dispersion of resin particle 3 | | | | | | | | | | | |
| Aqueous dispersion of resin particle 4 | | | | | | | | | | | |
| Aqueous dispersion of resin particle 5 | | | | | | | | | | | |
| Aqueous dispersion of resin particle 6 | | | | | | | | | | | |
| Aqueous dispersion of resin particle 7 | | | | | | | 25.00 | | | | |
| Aqueous dispersion of resin particle 8 | | | | | | | | | | | |
| 1,2-Propanediol | 15.00 | 15.00 | 15.00 | 15.00 | 15.00 | 15.00 | 15.00 | 15.00 | 27.28 | 17.30 | 15.00 |
| 2-Pyrrolidone | 3.00 | 3.00 | 3.00 | 3.00 | 3.00 | 3.00 | 3.00 | 3.00 | 3.00 | 3.00 | 3.00 |
| Acetylenol E60 | 0.90 | 0.90 | 0.90 | 0.90 | 0.90 | 0.90 | 0.90 | 0.90 | | | 0.90 |
| Proxel GXL(S) | 0.15 | 0.15 | 0.15 | 0.15 | 0.15 | 0.15 | 0.15 | 0.15 | | | |
| Alumina particle-containing liquid | | | | | | | | | | 1.55 | |
| Ion-exchanged water | 18.40 | 18.40 | 18.40 | 18.45 | 18.44 | 18.32 | 18.40 | 18.45 | 28.41 | 21.15 | 31.10 |
| Titanium oxide particle content T (%) | 15.00 | 15.00 | 15.00 | 15.00 | 15.00 | 15.00 | 15.00 | 15.00 | 16.50 | 12.00 | 10.00 |
| Amount of alumina covering surface of titanium oxide particle A (%) | 0.00 | 0.00 | 0.14 | 0.30 | 0.30 | 0.30 | 0.30 | 0.00 | 0.02 | 0.22 | 0.20 |
| Poly(acrylie acid) content P (%) | 0.05 | 0.05 | 0.05 | 0.00 | 0.01 | 0.13 | 0.05 | 0.00 | 0.06 | 0.00 | 2.00 |
| Value of P/A (times) | - | - | 0.36 | 0.00 | 0.04 | 0.43 | 0.17 | - | 3.00 | 0.00 | 10.00 |
| Amount of compound represented by formula (1) S (%) | 0.45 | 0.45 | 0.45 | 0.45 | 0.45 | 0.45 | 0.45 | 0.00 | 0.00 | 0.00 | 0.00 |
| Value of S/T (times) | 0.030 | 0.030 | 0.030 | 0.030 | 0.030 | 0.030 | 0.030 | 0.000 | 0.000 | 0.000 | 0.000 |
| Potassium ion content (ppm) | 352 | 631 | 352 | 928 | 928 | 928 | 0 | 631 | 0 | 380 | 4,125 |
| Total monovalent cation content (ppm) | 506 | 785 | 506 | 1,001 | 1,021 | 1,212 | 1,083 | 704 | 338 | 380 | 4,125 |

Evaluation

Each ink obtained above was evaluated for the following items. In Examples of the present disclosure, "A" and "B" were defined as acceptable levels, and "C" was defined as an unacceptable level in the evaluation criteria for each item described below. Table 10 presents the evaluation results.

Sedimentation Recovery Property

First, 8.0 g of each ink obtained above was placed in a 10-mL centrifugal tube composed of polytetrafluoroethylene. A portion of the liquid in a region extending from the upper surface of the liquid to a depth of about 1 cm was sampled. The absorbance at 550 nm was measured (referred to as "absorbance before shaking"). A spectrophotometer (trade name: "U-3011", available from Hitachi High-Tech Science Corporation) was used for the measurement of the absorbance. The ink was stored at 25° C. for 6 days and then was shaken at 180 rpm for 5 minutes with a shaker (trade name: "Labo Shaker Wide SR-5", available from As One Corp.) to re-disperse the titanium oxide particle. After the shaking, a portion of the liquid in a region extending from the upper surface of the liquid to a depth of about 1 cm was sampled. The absorbance at 550 nm was measured in the same manner (referred to as "absorbance after shaking"). The absorbance recovery rate was calculated on the basis of the equation: absorbance recovery rate=100×("absorbance after shaking")/("absorbance before shaking"). The sedimentation recovery property of the pigment was evaluated according to the following evaluation criteria.

A: The absorbance recovery rate was 90% or more.

B: The absorbance recovery rate was 85% or more to less than 90%.

C: The absorbance recovery rate was less than 85%.

Sticking Recovery Property

In an open system container, 5.0 g of each ink obtained above was placed. The ink was dried in an environment of a temperature of 30° C. and a relative humidity of 10% for 1 day. The mass of the ink residue in the vessel was measured (referred to as the "mass of the initial residue"). To the ink residue, 3.0 g of the same type of ink was added dropwise. The mixture was stirred. Thereafter, the ink containing the residue was filtered, and the mass of the residue was measured again (referred to as the "mass of the residue after re-dissolution"). The "residue rate after re-dissolution" was calculated on the basis of the equation of 100×("mass of the residue after re-dissolution")/("mass of the initial residue"), and the sticking recovery property of the ink was evaluated according to the following evaluation criteria. A lower residue rate after the re-dissolution results in the easier removal of the sticking matter of the ink dried in the recording head, that is, a better sticking recovery property of the ink.

A: The residue rate after re-dissolution was less than 20%.

B: The residue rate after re-dissolution was 20% or more to less than 50%.

C: The residue rate after re-dissolution was 50% or more.

TABLE 10

| Evaluation results | | | |
|---|---|---|---|
| | | Sedimentation recovery property | Sticking recovery property |
| Example | 1 | A | A |
| | 2 | A | A |
| | 3 | A | A |
| | 4 | A | A |
| | 5 | A | A |
| | 6 | A | A |
| | 7 | A | A |
| | 8 | A | B |

TABLE 10-continued

| Evaluation results | | Sedimentation recovery property | Sticking recovery property |
|---|---|---|---|
| | 9 | A | B |
| | 10 | B | A |
| | 11 | A | A |
| | 12 | A | A |
| | 13 | B | B |
| | 14 | B | A |
| | 15 | A | A |
| | 16 | A | A |
| | 17 | A | A |
| | 18 | B | B |
| | 19 | B | A |
| | 20 | A | A |
| | 21 | A | A |
| | 22 | B | A |
| | 23 | B | A |
| | 24 | A | A |
| | 25 | A | A |
| | 26 | A | A |
| | 27 | B | A |
| | 28 | B | A |
| | 29 | A | A |
| | 30 | A | A |
| | 31 | A | B |
| | 32 | B | B |
| Comparative example | 1 | C | B |
| | 2 | C | B |
| | 3 | C | B |
| | 4 | C | C |
| | 5 | C | C |
| | 6 | C | B |
| | 7 | A | C |
| | 8 | C | C |

TABLE 10-continued

| Evaluation results | Sedimentation recovery property | Sticking recovery property |
|---|---|---|
| 9 | B | C |
| 10 | C | C |
| 11 | C | C |

Color Developability of Secondary Color Image

After the undercoat was formed with the ink of Example 1, the color inks prepared as described below were applied to obtain a secondary color image, and the color developability of the secondary color image was evaluated.

Preparation of Color Pigment Dispersion

Color Pigment Dispersions 1 to 4

A pigment and a dispersant of the types and amounts given in Table 11 were mixed with ion-exchanged water used in an amount such that the total amount of components was 100.00%. Preliminary dispersion treatment was performed with a homogenizer. As the dispersant, a copolymer having a group with an affinity for a pigment (trade name: "DISPERBYK-199", available from BYK Japan KK) was used. Thereafter, dispersion treatment (main dispersion) was performed at 25° C. for 12 hours with a paint shaker using 0.5-mm zirconia beads. The zirconia beads were separated by filtration. An appropriate amount of ion-exchanged water was added thereto, as needed. Thereby, color pigment dispersions 1 to 4 were prepared.

Color Pigment Dispersion 5

As the color pigment dispersion 5, a pigment dispersion prepared by mixing a commercially available pigment dispersion (trade name: "Cab-O-Jet 400", available from Cabot Corporation, pigment content: 15.00%) with ion-exchanged water to adjust the pigment content to 14.00% was used. The pigment dispersion contains a self-dispersible pigment in which a phosphonic acid group was attached to the particle surface of a pigment (carbon black) via another atomic group.

TABLE 11

| Preparation conditions and properties of color pigment dispersion | | | | | | | |
|---|---|---|---|---|---|---|---|
| | Composition | | | | Properties | | |
| | Pigment | | Dispersant | | Pigment | | |
| Color pigment dispersion | Type | Amount used (%) | Type | Amount used (%) | Pigment content P (%) | dispersant content D (%) | Value of D/P (times) |
| 1 | C.I. Pigment Red 122 | 14.00 | DISPERBYK-199 | 15.00 | 14.00 | 6.00 | 0.43 |
| 2 | carbon black | 14.00 | DISPERBYK-199 | 15.00 | 14.00 | 6.00 | 0.43 |
| 3 | C.I. Pigment Blue 15:3 | 14.00 | DISPERBYK-199 | 15.00 | 14.00 | 6.00 | 0.43 |
| 4 | C.I. Pigment Yellow 74 | 14.00 | DISPERBYK-199 | 15.00 | 14.00 | 6.00 | 0.43 |
| 5 | carbon black | 14.00 | — | — | 14.00 | 0.00 | 0.00 |

Preparation of Color Ink

Components of the types and amounts given in the upper sections of Table 12 were mixed and stirred. Vinyblan 2685 (trade name) is a trade name of an acrylic emulsion (acrylic resin particle content: 30%) available from Nissin Chemical Industry Co., Ltd. The ion-exchanged water containing potassium hydroxide was ion-exchanged water to which potassium hydroxide was added so as to have the monovalent cation content given in the lower section of Table 12. The ion-exchanged water containing potassium hydroxide was added in such a manner that the total of the components was 100.0%. Thereafter, pressure filtration was performed with a membrane filter (available from Sartorius) having a pore size of 5.0 μm. Thereby, color inks 33 to 41 were prepared. The pH of each color ink was measured with a pH meter (trade name: "Portable pH Meter D-74", available from Horiba, Ltd). The pH of each color ink was in the range of 7.0 to 11.0.

Color Developability

The ink of Example 1 and each color ink prepared as described above were filled into ink cartridges. The ink cartridges were set in an ink jet recording apparatus (trade name: "PIXUS PRO10-S", available from CANON KABUSHIKI KAISHA) equipped with recording heads that eject the inks by the action of thermal energy. This apparatus performs printing in a serial manner and includes multiple ejection port arrays arranged along a sub-scanning direction (recording medium conveyance direction) perpendicular to the main scanning direction of the recording heads. The ink cartridge filled with the ink of Example 1 and the ink cartridge filled with the color ink were set in the apparatus in such a manner that the ejection port arrays thereof were adjacent to each other. In this example, an image recorded under conditions in which four ink droplets each having a weight of 3.8 ng are applied to a unit region (one pixel) of 1/600 inch×1/600 inch is defined as a recording duty of 100%. Under these conditions, an evaluation image as described below was recorded by multi-pass recording (the application of the inks to the unit region of the recording medium was performed in multiple relative scans between the recording heads and the recording medium).

Specifically, the evaluation image was recorded under the conditions that the ink of Example 1 and the color ink were applied in an overlapping manner in different recording passes. The ink of Example 1 was set so as to be ejected from ejection ports corresponding to ½ of the ejection port array located upstream in the sub-scanning direction. The color ink was set so as to be ejected from the ejection ports corresponding to ½ of the ejection port array located downstream in the sub-scanning direction. A solid image in which the recording duty of the color ink was 100% was recorded so as to overlap a solid image in which the recording duty of the white ink was 100%. The resulting recorded matter was dried in an oven at 120° C. for 10 minutes to obtain an evaluation image.

For the secondary color image in the evaluation image obtained above, L*, a* and b* in the Lab color system were measured using a fluorescence spectrodensitometer (trade name: "FD-7", available from Konica Minolta Japan, Inc). The chroma C* was calculated on the basis of the equation $C^*=\{(L^*)^2+(a^*)^2+(b^*)^2\}^{1/2}$. The color developability of the secondary color image was evaluated according to the following evaluation criteria. A higher value of the chroma C* of the image means better color developability of the image.

A: The value of chroma C* of the image was 35 or more.

B: The value of chroma C* of the image was less than 35.

The color developability of the secondary color images in Examples 40 and 41 was "B", which was the same as that in Example 39. However, the secondary color image in Example 39 exhibited superior color developability.

TABLE 12

| Composition, properties and evaluation result of color ink | | | | | | | | | |
|---|---|---|---|---|---|---|---|---|---|
| | Example | | | | | | | | |
| Type of color ink | 33 | 34 | 35 | 36 | 37 | 38 | 39 | 40 | 41 |
| Color pigment dispersion 1 | 25.00 | | | | | 25.00 | 25.00 | 25.00 | 25.00 |
| Color pigment dispersion 2 | | 25.00 | | | | | | | |
| Color pigment dispersion 3 | | | 25.00 | | | | | | |
| Color pigment dispersion 4 | | | | 25.00 | | | | | |
| Color pigment dispersion 5 | | | | | 25.00 | | | | |
| Vinyblan 2685 | 20.00 | 20.00 | 20.00 | 20.00 | 20.00 | 20.00 | 20.00 | 20.00 | 20.00 |
| 1,2-Propanediol | 15.00 | 15.00 | 15.00 | 15.00 | 15.00 | 15.00 | 15.00 | 15.00 | 15.00 |
| 2-Pyrrolidone | 3.00 | 3.00 | 3.00 | 3.00 | 3.00 | 3.00 | 3.00 | 3.00 | 3.00 |
| Acetylenol E60 | 1.00 | 1.00 | 1.00 | 1.00 | 1.00 | 1.00 | 1.00 | 1.00 | 1.00 |
| Ion-exchanged water containing potassium hydroxide | 36.00 | 36.00 | 36.00 | 36.00 | 36.00 | 36.00 | 36.00 | 36.00 | 36.00 |
| Monovalent cation content $M_2$ (ppm) | 2,164 | 2,164 | 2,164 | 2,164 | 2,164 | 1,515 | 5,410 | 1,407 | 5,518 |
| Color developability | A | A | A | A | A | A | B | B | B |

According to an embodiment of the present disclosure, it is possible to provide a titanium oxide-containing aqueous ink that is used for ink jet recording and that has superior sedimentation recovery property of a pigment and sticking recovery property of the ink, an ink cartridge including the aqueous ink, and an ink jet recording method.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-165007 filed Oct. 6, 2021 and No. 2022-145603 filed Sep. 13, 2022, which are hereby incorporated by reference herein in their entirety.

What is claimed is:

1. An aqueous ink for ink jet recording, comprising:

a titanium oxide particle;

a poly(acrylic acid) or a salt thereof; and a potassium ion, wherein the titanium oxide particle contains titanium oxide, at least part of a surface of the titanium oxide is covered with alumina and silica, an amount of the poly(acrylic acid) or the salt thereof contained in the aqueous ink is 0.05 times or more to 0.40 times or less an amount of the alumina contained in the titanium oxide particle in terms of a mass ratio, and an amount of the poly(acrylic acid) or the salt thereof is 0.01% by mass or more to 0.50% by mass or less based on a total mass of the ink.

2. The aqueous ink according to claim 1, further comprising a monovalent cation different from the potassium ion, wherein an amount of the potassium ion is larger than an amount of the monovalent cation different from the potassium ion in terms of a mass ratio.

3. The aqueous ink according to claim 1, wherein a proportion of the alumina in the titanium oxide particle is 0.50 times or more to 1.00 time or less a proportion of the silica in the titanium oxide particle in terms of a mass ratio.

4. The aqueous ink according to claim 1, wherein a proportion of the titanium oxide in the titanium oxide particle is 90.00% by mass or more based on a total mass of the titanium oxide particle.

5. The aqueous ink according to claim 1, wherein a proportion of the titanium oxide in the titanium oxide particle is 98.50% by mass or less based on a total mass of the titanium oxide particle.

6. The aqueous ink according to claim 1, wherein a proportion of the alumina in the titanium oxide particle is 0.50% by mass or more to 4.00% by mass or less based on a total mass of the titanium oxide particle.

7. The aqueous ink according to claim 1, wherein a proportion of the silica in the titanium oxide particle is 1.00% by mass or more to 4.00% by mass or less based on a total mass of the titanium oxide particle.

8. The aqueous ink according to claim 1, wherein a proportion of an aluminum element in the titanium oxide particle is 0.57 times or more to 1.13 times or less a proportion of a silicon element in the titanium oxide in terms of a mass ratio, the proportions being obtained by inductively coupled plasma-optical emission spectrometry.

9. The aqueous ink according to claim 1, wherein the titanium oxide particle has a 50% cumulative particle size of 200 nm or more to 400 nm or less on a volume basis.

10. The aqueous ink according to claim 1, wherein an amount of the titanium oxide particle contained in the aqueous ink is 1.00% by mass or more to 20.00% by mass or less based on a total mass of the ink.

11. The aqueous ink according to claim 1, wherein the poly(acrylic acid) or the salt thereof has a weight-average molecular weight of 1,000 or more to 6,000 or less.

12. The aqueous ink according to claim 1, wherein the poly(acrylic acid) or the salt thereof has a weight-average molecular weight of 1,000 or more to 3,000 or less.

13. The aqueous ink according to claim 1, wherein the aqueous ink has a potassium ion content of 300 ppm or more based on a total mass of the ink.

14. The aqueous ink according to claim 1, wherein the aqueous ink has a total monovalent cation content of 700 ppm or more to 1,300 ppm or less based on a total mass of the ink.

15. The aqueous ink according to claim 1, further comprising a compound represented by the following formula (1):

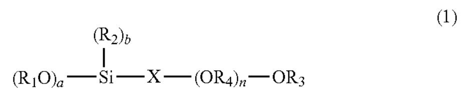

(1)

where in formula (1), $R_1$, $R_2$ and Rs are each independently a hydrogen atom or an alkyl group having 1 to 4 carbon atoms, each $R_4$ is independently an alkylene group having 2 to 4 carbon atoms, X is a single bond or an alkylene group having 1 to 6 carbon atoms, n is 6 to 24, a is 1 to 3, b is 0 to 2 and a +b=3.

16. The aqueous ink according to claim 15, wherein an amount of the compound, represented by formula (1), contained in the aqueous ink is 0.002 times or more to 0.10 times or less an amount of the titanium oxide particle contained in the aqueous ink in terms of a mass ratio.

17. The aqueous ink according to claim 1, wherein the aqueous ink has a pH of 7.0 or more to 9.0 or less.

18. An ink cartridge, comprising an ink; and an ink storage portion storing the ink, wherein the ink comprises the aqueous ink according to claim 1.

19. An ink jet recording method of recording an image onto a recording medium by ejecting an ink from an ink jet recording head, wherein the ink comprises the aqueous ink according to claim 1.

20. The aqueous ink according to claim 1, wherein the titanium oxide comprises a rutile-type titanium oxide.

21. The aqueous ink according to claim 15, wherein a dispersant for dispersing the titanium oxide particle comprises the compound represented by the formula (1).

22. The aqueous ink according to claim 15, wherein the titanium oxide particle is dispersed by the compound represented by the formula (1).

23. An aqueous ink for ink jet recording, comprising:

a titanium oxide particle;

a poly(acrylic acid) or a salt thereof; and a potassium ion, wherein the titanium oxide particle contains titanium oxide, at least part of a surface of the titanium oxide is covered with alumina and silica, an amount of the poly(acrylic acid) or the salt thereof contained in the aqueous ink is 0.05 times or more to 0.40 times or less an amount of the alumina contained in the titanium oxide particle in terms of a mass ratio, and the aqueous ink has a total monovalent cation content of 700 ppm or more to 1,300 ppm or less based on a total mass of the ink.

* * * * *